(12) United States Patent
Tanaka

(10) Patent No.: US 7,782,480 B2
(45) Date of Patent: *Aug. 24, 2010

(54) IMAGE FORMING APPARATUS

(75) Inventor: Satoru Tanaka, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 339 days.

This patent is subject to a terminal disclaimer.

(21) Appl. No.: 12/051,520

(22) Filed: Mar. 19, 2008

(65) Prior Publication Data

US 2008/0165371 A1    Jul. 10, 2008

Related U.S. Application Data

(63) Continuation of application No. 10/427,953, filed on May 2, 2003, now Pat. No. 7,405,843.

(30) Foreign Application Priority Data

May 10, 2002    (JP) .............................. 2002-136032

(51) Int. Cl.
*G06F 15/00*    (2006.01)
*G06F 13/00*    (2006.01)

(52) U.S. Cl. ...................................... 358/1.3; 710/100

(58) Field of Classification Search .................. 358/1.3, 358/448, 1.15, 1.16, 1.18, 1.17, 471, 474, 358/1.14, 1.13; 710/100, 129; 370/20, 331
See application file for complete search history.

(56) References Cited

U.S. PATENT DOCUMENTS

2003/0227637 A1 *    12/2003    Tanaka ........................ 358/1.3

* cited by examiner

*Primary Examiner*—Saeid Ebrahimi Dehkordy
(74) *Attorney, Agent, or Firm*—Oblon, Spivak, McClelland, Maier & Neustadt, L.L.P.

(57) ABSTRACT

An image forming apparatus includes a controller having an integrated circuit for image processing. The controller is connected to an engine via a peripheral component interconnect (PCI). The engine includes a plotter and a scanner. The controller includes a central processing unit (CPU) to which a chip-set is connected via an accelerated graphics port (AGP). The controller also includes an application specific integrated circuit (ASIC) that controls whether to output scanner image data, which is data acquired by the scanner, to the PCI as plotter data for the plotter, or to output the scanner image data to the AGP, or to output image data input through the AGP to the PCI as plotter data for the plotter. The ASIC includes a combiner that combines a plurality of image data.

14 Claims, 19 Drawing Sheets

FIG. 6
PCI MEM SPACE
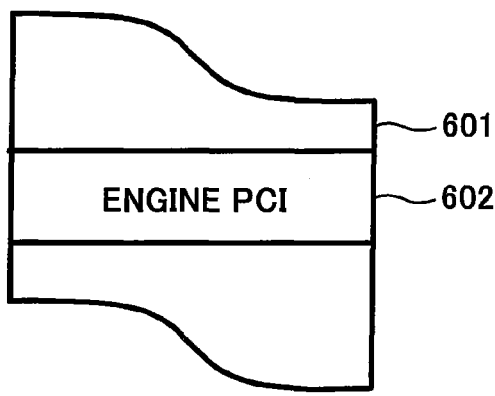
FIG. 7
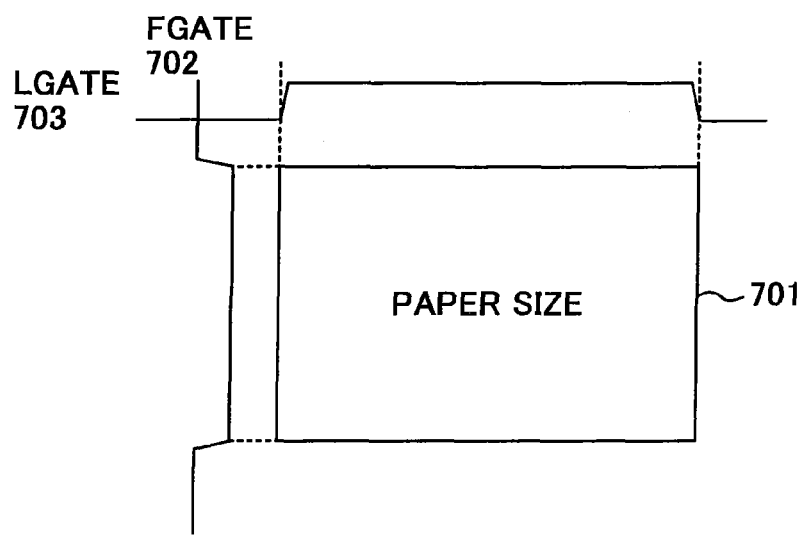
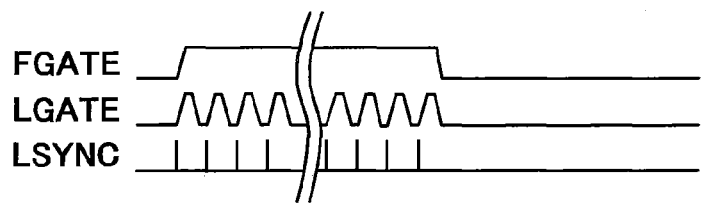

ROTATION OUTPUT

IMAGE FORMING APPARATUS

CROSS REFERENCE

This application is a continuation of and is based upon and claims the benefit of priority under 35 U.S.C. §120 for U.S. Ser. No. 10/427,953, filed May 2, 2003, now U.S. Pat. No. 7,405,843, and claims the benefit of priority under 35 U.S.C. §119 from Japanese Patent Application No. 2002-136032, filed May 10, 2002, the entire contents of each which are incorporated herein by reference.

BACKGROUND OF THE INVENTION

1) Field of the Invention

The present invention relates to an image forming apparatus that has an engine section having a scanner, a plotter, and a CPU, connected to a controller having an integrated circuit for image processing, thereby to carry out image formation processing under the control of the CPU.

2) Description of the Related Art

Conventionally, in many cases, an image forming apparatus such as a printer or a copying machine has an engine section connected with a controller that includes an application specific IC (ASIC) for image processing and a central processing unit (CPU), and carries out an image formation processing by using this controller.

For example, in the copying machine, the ASIC that has a plurality of hardware elements for image processing is mounted on the controller, and this ASIC and the engine are connected to each other via a peripheral component interconnect (PCI) interface. A CPU and the ASIC are connected to each other. The copying machine carries out copying under the control of the CPU.

If an image forming apparatus with excellent performance is to be manufactured, the controller that executes drawing and control is replaced with a high-speed controller for each unit.

However, interfaces of conventional CPUs are made open, but interfaces of recently available reduced instructions set computer (RISC)-type general-purpose CPUs are not made open. Therefore, it is necessary to connect the ASIC with the CPU via a chip-set, which restricts the performance of the CPU.

Specifically, when the CPU is connected with an external device via the chip-set, a PCI bus is usually used. However, the PCI that passes through the chip-set has low performance. Therefore, the PCI is not suitable for structuring an image forming apparatus such as a printer and a copying machine.

Consequently, when the CPU whose interface is not made open is utilized for the controller of the image forming apparatus, how properly data is to be transferred between the chip-set of the CPU and the engine and how best to execute a high-speed image formation processing are extremely important issues.

Particularly, some of recently available multi-function machines have functions of a copying processing, a printer processing, and a facsimile processing that are not controlled by individual CPUs mounted on separate boards unlike the conventional technology, but controlled by one and the same CPU. Therefore, how to solve the reduction in performance is an extremely important issue.

Further, these multi-function machines have a function of combining a plurality of scanned image data or a plurality of image data to be printed, and outputting a combined one image data, based on the instruction from a user, at the time of forming images for a copier or a printer. When the image data combining function is executed, how to achieve a high-speed image formation processing is an extremely important issue as well.

SUMMARY OF THE INVENTION

It is an object of this invention to solve at least the problems in the conventional technology.

The image forming apparatus according to one aspect of this invention a controller that includes an integrated circuit for image processing; and an engine unit that is connected to the controller and includes a scanner that scans a medium and obtains scanner image data; a plotter that plots an image based on input plotter data, wherein the plotter is as either one of a black and white plotter and a one-drum color plotter; and a first central processing unit that controls image formation. The controller includes an engine interface to connect to the engine unit; a second central processing unit with a chip-set; a chip-set interface to connect the chip-set of the second central processing unit; a switching controller that controls whether to output the scanner image data, which is input through the engine interface, to the engine interface as the plotter data for the plotter, or to output the scanner image data to the chip-set interface, or to output image data input through the chip-set interface to the engine interface as the plotter data for the plotter; and a combining controller that combines a plurality of the scanner image data to generate one scanner image data.

The image forming apparatus according to another aspect of this invention a controller that includes an integrated circuit for image processing; and an engine unit that is connected to the controller and includes a scanner that scans a medium and obtains scanner image data; a four-drum color plotter that plots an image based on input plotter data; and a first central processing unit that controls image formation. The controller includes an engine interface to connect to the engine unit; a second central processing unit with a chip-set; a chip-set interface to connect the chip-set of the second central processing unit; a switching controller that controls whether to output the scanner image data, which is input through the engine interface, to the engine interface as the plotter data for the plotter, or to output the scanner image data to the chip-set interface, or to output image data input through the chip-set interface to the engine interface as the plotter data for the plotter; and a combining controller that combines a plurality of scanner image data to generate one scanner image data.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 6 shows a PCIMEM space of an engine;

FIG. 7 shows an operation timing of the engine;

DETAILED DESCRIPTION

Exemplary embodiments of the image forming apparatus according to the present invention are explained in detail below with reference to the accompanying drawings.

Figure 1:
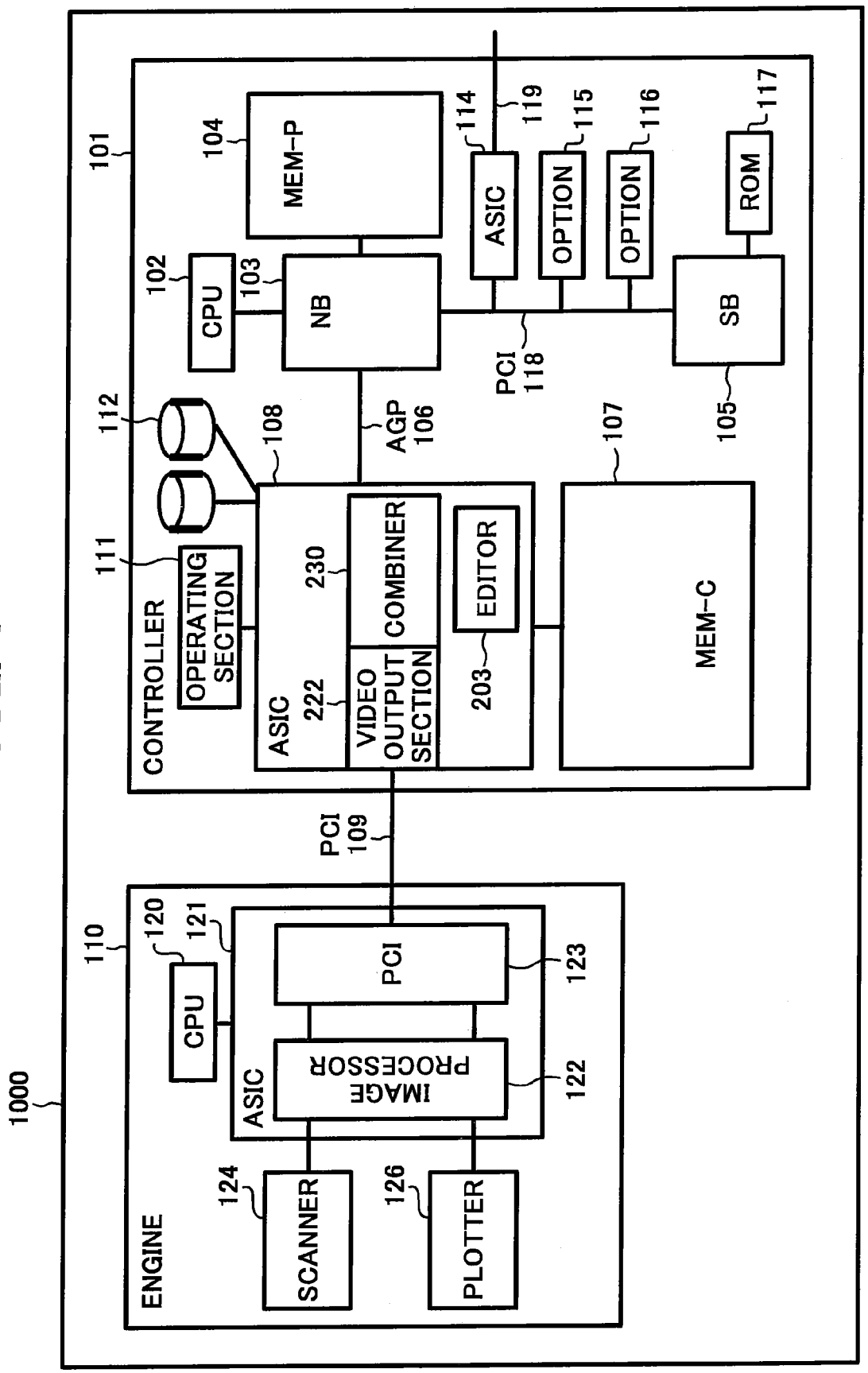
FIG. 1 illustrates a configuration of a multi-function machine according to a first embodiment of the present invention.

FIG. 1 shows a total configuration of an image forming apparatus (hereinafter, "multi-function machine") according to a first embodiment. As shown in FIG. 1, this multi-function machine 1000 has a controller 101 and an engine section 110 connected to each other via a PCI 109. The controller 101 controls the whole of the multi-function machine, and controls drawing, communications, and an input through an operating section 111. The engine section 110 has a scanner 124 and a plotter 126. The plotter 126 is a black and white plotter, or a one-drum color plotter. The scanner 124 is a scanner or a facsimile unit. The engine section 110 has an ASIC 121 including an image processor 122 that carries out image processing such as error diffusion or gamma conversion and a PCI 123, and a CPU 120, in addition to the plotter 126 and the scanner 124 that are so-called an engine part.

The controller 101 has a CPU 102, a north bridge (NB) 103, a system memory (MEM-P) 104, a south bridge (SB) 105, a local memory (MEM-C) 107, an ASIC 108, the operating section 111, a plurality of hard disk drives (HDDs) 112, an ASIC 114, OPTIONs 115 and 116, and a read only memory (ROM) 117. The north bridge (NB) 103 and the ASIC 108 are connected to each other via an accelerated graphics port (AGP) 106. The NB 103 and the SB 105 are connected to each other via a PCI 118. The ASIC 108 constitutes a switch controller according to the present invention.

The CPU 102 controls the whole of the multi-function machine, and has a chip-set including the NB 103, the MEM-P 104, the ASIC 114, the OPTIONs 115 and 116, the ROM 117, and the SB 105. The interface of the CPU 102 is not made open, and therefore another device is connected via the chip-set.

The NB 103 is a bridge that connects the CPU 102 with the MEM-P 104, the SB 105, and the AGP 106 respectively. The MEM-P 104 is a system memory used as a drawing memory or the like of the multi-function machine. The SB 105 is a bridge that connects the NB 103 with the ROM 117, the PCI device, and peripheral devices. The OPTIONs 115 and 116 are free slots for connecting optional PCI devices and peripheral devices.

The MEM-C 107 is a local memory used as an image buffer for copying or a code buffer. The ASIC 108 is an integrated circuit (IC) for an image processing application having a hardware element for image processing. The ASIC 108 has a function as a bridge connecting the AGP 106, the PCI 109, the HDD 112, and the MEM-C 107 with each other.

The operating section 111 receives an input operation from a user, and provides a display for the user. The HDD 112 is a storage that stores image data, programs, font data, and forms.

The AGP 106 is a bus interface for a graphic accelerator card proposed to increase the graphic processing speed. Through a direct access to the system memory in high throughput, the AGP 106 increases the processing speed of the graphics accelerator card.

The AGP 106 is basically used to display a three-dimensional image on a display. The multi-function machine according to the first embodiment connects the NB 103 and the ASIC 108 via the AGP 106.

As the interface of the CPU 102 is not made open, the ASIC 108 is connected to the CPU 102 via the NB 103 as a part of the chip-set. When a PCI bus is used to connect between the two, performance is lowered. Therefore, the AGP 106 is extensively utilized in the present embodiment.

A combiner 230 combines a plurality of image data to generate one combined image data, and outputs the combined image data to a video output section 222. An editor 203 is an editing unit that combines a plurality of image data to generate one image data. The video output section 222 is a unit that is connected to the combiner 230 and outputs the image data to the engine section 110 via the PCI 109. Therefore, it is possible to output the image data combined by the combiner 230, directly from the video output section 222 to the engine section 110, based on the switch control carried out by the ASIC 108, without storing the combined image data in the MEM-C 107.

The combiner 230 and the editor 203 constitute a combining controller in the present invention. The combiner 230 constitutes a first combining section in the present invention, and the editor 203 constitutes a second combining section in the present invention. Detailed configurations of the combiner 230, the editor 203, and the video output section 222 are described later.

Figure 2:
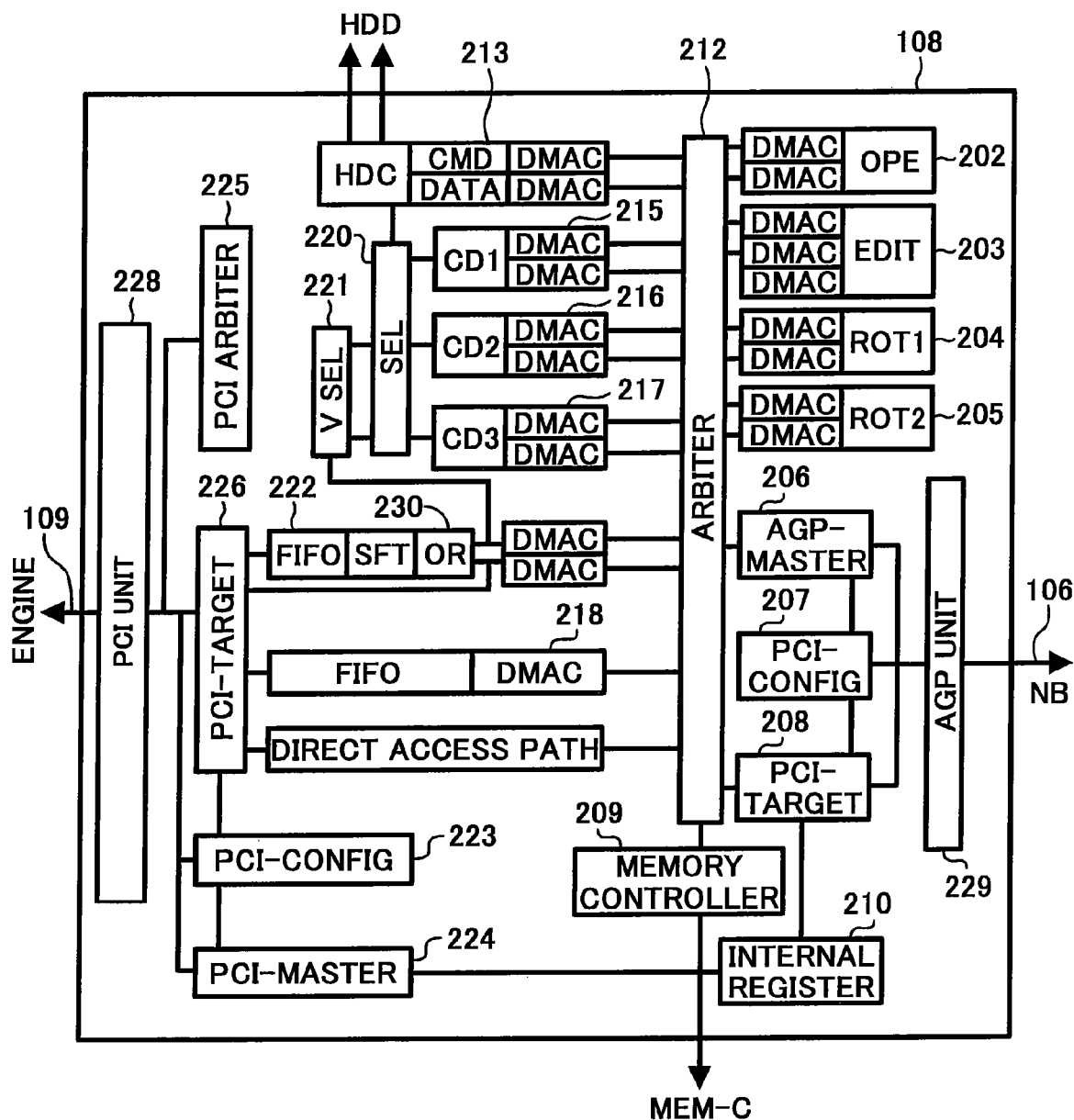
FIG. 2 is a block diagram of an ASIC of the multi-function machine according to the first embodiment.

The configuration of the ASIC 108 shown in FIG. 1 is explained next. FIG. 2 is a block diagram of the ASIC 108 shown in FIG. 1. As shown in FIG. 2, this ASIC 108 has an AGP unit 229, a configuration (PCI-CONFIG) register 207, a master (AGP-MASTER) unit 206, a target (PCI-TARGET) unit 208, an internal register 210, a memory controller 209, a configuration (PCI-CONFIG) register 223, a master (PCI-MASTER) unit 224, a target (PCI-TARGET) unit 226, a PCI unit 228, an arbiter 212, a PCI arbiter 225, the combiner (OR) 230, the editor (EDIT) 203, two rotaters (ROT1 and ROT2)

204 and 205, a hard disk drive (HDD) controller 213, three compressor/decompressors (CD1, CD2, and CD3) 215 to 217, an operating section (OPE) 202, a video input section 218, and the video output section 222.

The AGP unit 229 is a unit (i.e., a chip-set interface) that executes a bus protocol of the AGP bus 106 connected to the NB 103. The PCI-CONFIG 207 is a configuration register of the PCI for the AGP bus 106. The AGP-MASTER 206 is a unit that executes a bus master function of the AGP bus 106. The PCI-TARGET 208 is a unit that executes a target function of the PCI included in the AGP bus 106.

The internal register 210 is necessary when each section of the ASIC 108 achieves its function. The memory controller 209 controls the local memory MEM-C 107. The PCI-CONFIG 223 is a configuration register of the PCI for the PCI bus 109. The PCI-MASTER 224 is a unit that executes a bus master function of the PCI 109. The PCI-TARGET 226 is a unit that executes a target function of the PCI included in the PCI 109. The PCI arbiter 225 arbitrates an access to the PCI 109. The PCI unit 228 is a unit (i.e., an engine interface) that executes a bus protocol of the PCI 109. The arbiter 212 arbitrates an access to the MEM-C 107.

The editor (EDIT) 203 is a unit that combines and edits image data, and has three direct memory access controllers (DMACs) for images. The editor (EDIT) 203 reads a plurality of image data from the local memory MEM-C 107, combines the image data, and writes back the combined image data to the local memory MEM-C 107 based on the switch control of the ASIC 108. However, when the editor (EDIT) 203 further reads the image data and carries out a videoutput after writing back the combined image data to the local memory MEM-C 107, an extra bandwidth of the local memory MEM-C 107 is used, which further requires an extra work area.

Therefore, the multi-function machine according to the first embodiment further has the combiner 230. In other words, the combiner 230 consists of image DMACs and a functional unit (OR) that combines image data. The combiner 230 reads once the combined image data from the local memory MEM-C 107, and directly passes the combined image data to a first-In first-out (FIFO) of the video output section 222. Based on this, it is possible to avoid securing an extra work area in the local memory MEM-C 107. It is also possible to increase the bandwidth of the local memory MEM-C 107. As a result, it is possible to prevent a reduction in the speed of writing to the HDD 112 and a reduction in the total processing.

It is considered possible to provide the combiner 230 and the editor 203 in the engine section 110. The ASIC 108 is connected to the NB 103 via the AGP 106, thereby making it possible to carry out a high-speed data transfer. However, if the combiner 230 and the editor 203 are provided in the engine section 110, it is not possible to take advantage of such a high-speed data transfer. Therefore, in the multi-function machine 1000 according to this embodiment, the combiner 230 and the editor 203 are provided in the ASIC 108 connected to the NB 103 via the AGP 106. Based on this, it is possible to improve the high-speed data transfer at the time of combining a plurality of image data.

The two rotaters 204 and 205 rotate image data at specified angles. Each rotater has two DMACs. Each DMAC is a direct memory access (DMA) controller that carries out a DMA transfer to the local memory MEM-C 107.

The three compressor/decompressors 215 to 217 are units that compress or decompress image data, and that are connected to the arbiter 212. The compressor/decompressors 215 to 217 are connected to the video output section 222 via selectors (SEL 220 and VSEL 221) that are provided inside.

The compressor/decompressors 215 to 217 are configured to read compressed image data stored in the local memory MEM-C 107, decompress the image data, and directly pass the data to the video output section 222, without writing back the data to the local memory MEM-C 107. Based on this, it is possible to carry out a video output to the engine section 110, without requiring an additional work area in the local memory MEM-C 107 or an additional bandwidth. The SEL 220 is a selector that selects a bus through which the compressed image data or the decompressed image data is directly transferred to the HDD 112. The VSEL 221 is a selector that selects a bus through which the decompressed image data is directly passed to the video output section 222.

The video input section 218 inputs image data from the engine section 110 via the PCI 109, and includes a FIFO for inputting image data, and a DMAC for inputting image data.

The video output section 222 includes a shifting unit (SFT) that shifts an image, and a FIFO that supports a burst transfer of the PCI. When a user instructs to print image data on both sides of paper, it is necessary that the rotaters 204 and 205 rotate the image data by 180 degrees, and output the image data to the engine section 110. In this case, the image is decomposed into rectangular bands and is further compressed. The decomposed images are sequentially decompressed from the header band positioned when the image data is rotated by 180 degrees. However, the compressor/decompressors 215 to 217 can decompress only in a direction of 0 degree. Therefore, the compressor/decompressors 215 to 217 once decompress the images in the direction of 0 degree, and the video output section 222 reads the image data from the direction of 180 degrees that is the opposite direction to the sub-scanning direction. Based on this, it is possible to carry out the video output at the angle of 180 degrees using the memory for the bands.

The HDD controller 213 includes a command DMAC that issues a command, a data DMAC that transfers data, and a hard disc controller (HDC) that transfers a signal to the HDD. Up to two HDDs can be connected to the HDD controller 213. When a higher transfer speed is necessary, it is possible to operate HDDs in parallel corresponding to the number of power of 2, such as four and eight HDDs. The number of HDDs to be connected is limited to two, because the speed of the engine of black and white colors is around 100 CPM (Copy Per Minute) and it is possible to obtain a transfer speed that is two times the transfer speed of one HDD by allowing two HDDs to be operated in parallel. This transfer speed is sufficient for the multi-function machine of white and black colors.

Figure 3:
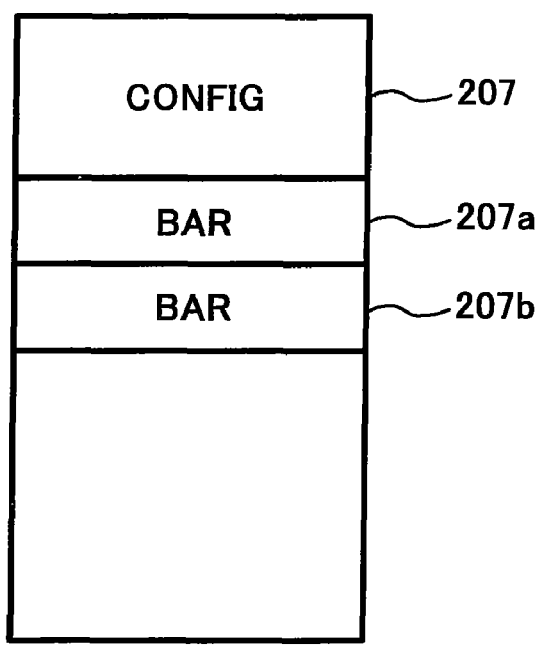
FIG. 3 illustrates an internal configuration of a PCI-CON-FIG.

An internal configuration of the PCI-CONFIG 207 shown in FIG. 2 is explained next. FIG. 3 shows the internal configuration of the PCI-CONFIG 207. As shown in FIG. 3, the PCI-CONFIG 207 that is the configuration register at the AGP bus side 106 included in the ASIC 108 has two base address registers of BAR 207a and BAR 207b.

The BAR 207a is a base address register that maps the local memory MEM-C 107. The BAR 207b is a base address register that maps memory spaces of the internal register 210 and the PCI, and an I/O space of the PCI.

Figure 4:
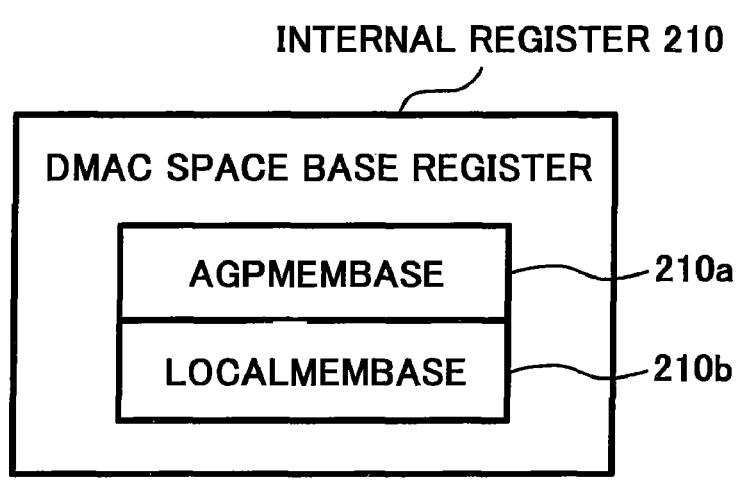
FIG. 4 shows a space base register for a DMAC provided on an internal register.

A space base register for the DMAC provided on the internal register 210 shown in FIG. 2 is explained next. FIG. 4 shows the space base register for the DMAC that is provided on the internal register 210 shown in FIG. 2.

As shown in FIG. 4, an AGPMEMBASE register 210a and a LOCALMEMBASE register 210b exist in the internal register 210. The AGPMEMBASE register 210a is a register to which a base address of the map of the AGP space of the NB 103 is set. This AGPMEMBASE register 210a is provided to inform the DMAC of an access destination. The LOCALMEMBASE register 210b is a register to which a base address of the map of the memory space of the ASIC 108 is set. This LOCALMEMBASE register 210b is provided to inform the DMAC of an access destination.

Figure 5:
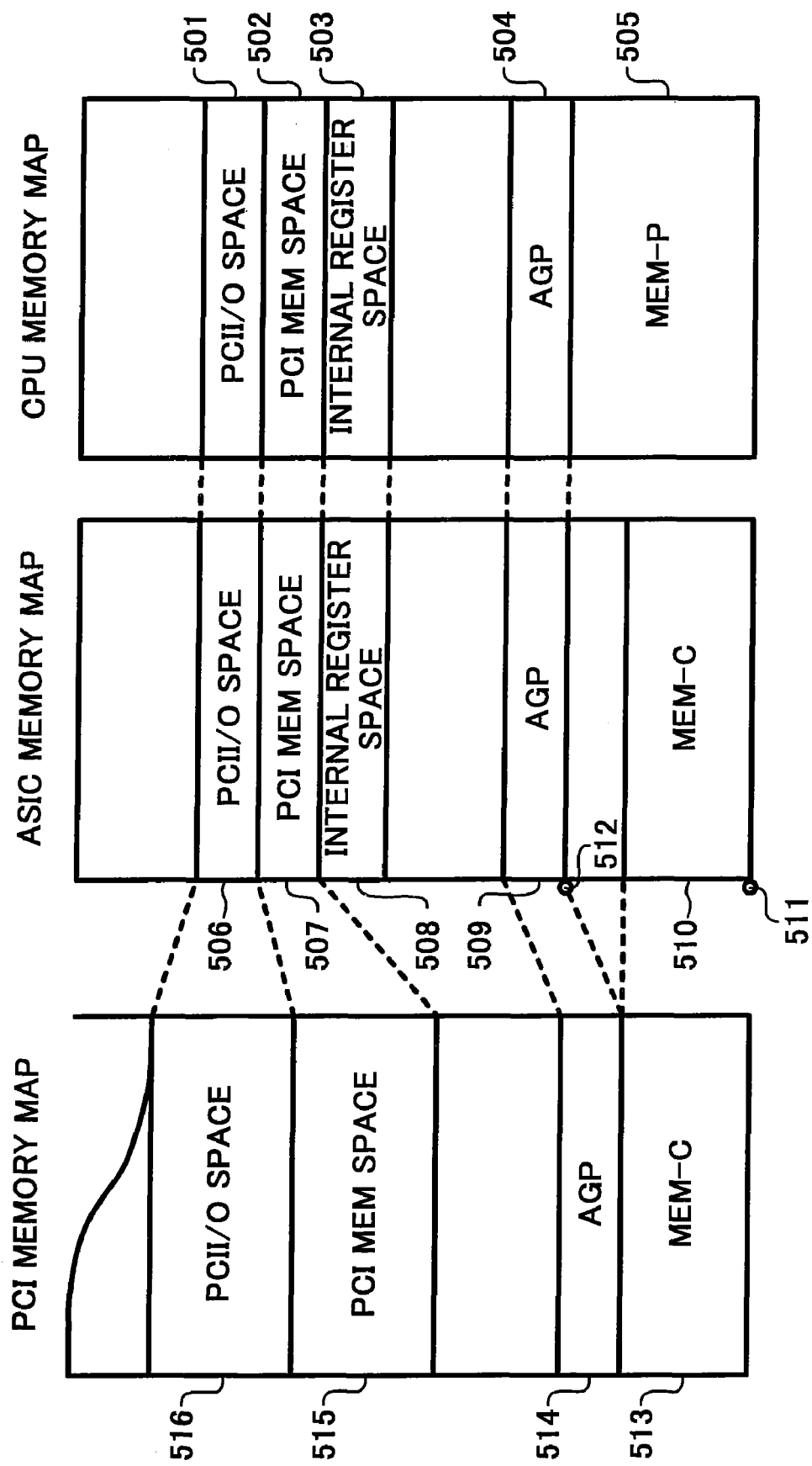
FIG. 5 shows a mutual relationship between memory maps of a PCI, the ASIC, and a CPU.

A relationship between the memory maps of the PCI 109, the ASIC 108, and the CPU 102 respectively is explained next. FIG. 5 shows the relationship between the memory maps of the PCI 109, the ASIC 108, and the CPU 102 respectively.

In FIG. 5, a PCI I/O space 501 is a PCI I/O space of the ASIC 108 observed in the CPU 102. A PCIMEM space 502 is a PCIMEM space of the ASIC 108 observed in the CPU 102. An internal register space 503 is an internal register space of the ASIC 108 observed in the CPU 102. An AGP 504 is a memory space that can be accessed by an AGP bus protocol managed within the NB 103. An MEM-P 505 is a memory space managed by the NB 103.

A PCI I/O space 506 is a PCI I/O space of the ASIC 108, a PCIMEM space 507 is a PCIMEM space of the ASIC 108, and an internal register space 508 is an internal register space of the ASIC 108. An AGP 509 is a memory space that can be accessed by an AGP bus protocol from the ASIC 108, and an MEM-C 510 is a memory space managed by the ASIC 108. A base 511 is a header address of the MEM-C 510, and a base 512 is a header address of the AGP space 509.

A MEM-C 513 is a memory space of the MEM-C 107 that can be accessed from the engine section 110. An AGP 514 is an AGP space that can be accessed from the engine section 110. A PCIMEM space 515 is a PCIMEM space that the CPU 102 actually accesses via the ASIC 108. A PCI I/O space 516 is a PCI I/O space that the CPU 102 actually accesses via the ASIC 108.

As shown in FIG. 5, the PCI I/O space 516, the PCI I/O space 506, and the PCI I/O space 501 are mutually related to each other, and the PCIMEM space 515, the PCIMEM space 507, and the PCIMEM space 502 are mutually related to each other. The internal register space 508 and the internal register space 503 are mutually related to each other.

Further, the AGP 514, the AGP 509, and the AGP 504 are mutually related to each other, and the MEM-C 513, the MEM-C 510, and the MEM-P 505 are mutually related to each other. Details of the mapping are explained later.

The operation of the printer shown in FIG. 1 is explained next. When the power source of the printer is turned on, the CPU 102 starts the initialization from the basic input output system (BIOS), not shown, provided farther from the SB 105, and initializes the NB 103 and initializes the SB 105. During the initialization, the CPU 102 accesses the PCI-CONFIG 207 of the ASIC 108 via the AGP 106, carries out setting to the BAR 207a and the BAR 207b shown in FIG. 3, and completes the initialization of the ASIC 108 as the AGP device.

Upon completion of the initialization of the ASIC 108 as the AGP device in the above manner, it is possible to access the internal register 210 of the ASIC 108. Specifically, an address of the AGP space to be mapped within the ASIC 108 is set to the AGPMEMBASE register 210a of the internal register 210. An address of the local memory MEM-C 107 directly managed by the ASIC 108 to be mapped is set to the LOCALMEMBASE register 210b.

In other words, the address of the base 512 shown in FIG. 5 is set to the AGPMEMBASE register 210a shown in FIG. 4, and the address of the base 511 is set to the LOCALMEMBASE register 210b. When a mapping is carried out, the memory map shown in FIG. 5 is obtained.

As a result, when viewed from the CPU 102, the system memory exists at the position of the MEM-P 505, and the AGP space 504 is mapped on this system memory. The AGP space 504 is set in the register of the NB 103. Therefore, the register mapped in the PCI space is observed at the higher address.

The internal register space 503, the PCIMEM space 502, and the PCI I/O space 501 are set to the BAR 207a of the PCI-CONFIG 207. It is possible to set the spaces to the BAR 207b of the MEM-C 107 that is under the management of the ASIC 108, and to access the spaces from the CPU 102 via the PCI.

The base address set to the BAR 207a means the header of the internal register 508. The PCIMEM space 507 and the PCI I/O space 506 are fixedly defined by offset with respect to the base address.

When the CPU 102 makes a write access to the PCIMEM space 507, this access is posted. The CPU 102 is released, and can start the next work. This write access is written to the PCIMEM space 515 at the same address of the PCI 109. When a write access is made to the PCI I/O space 506, the write access is similarly written to the PCI I/O space 516 of the PCI 109.

When the CPU 102 makes a read access to the PCIMEM space 502, the NB 103 converts this access into the AGP access, and makes a read access to the PCIMEM space 507 of the ASIC 108.

The ASIC 108 accesses the PCIMEM space 515 of the PCI 109, but it takes time to read the data. Therefore, the ASIC 108 once returns a retry to the NB 103 regarding the AGP access from the CPU 102. Upon receiving the retry signal, the NB 103 repeats the read access. The ASIC 108 reads the data from the PCI 109. When the data is ready, the ASIC 108 returns the data to the NB 103. The NB 103 passes the data to the CPU 102. Thus, the data transaction is completed.

A CONFIG register exists in the engine section 110 connected to the PCI 109. When the base address of this register is mapped to a certain position in the PCIMEM space 515, it becomes possible to access an engine PCI register 602 of the engine section 110 shown in FIG. 6. A PCIMEM space 601 shown in FIG. 6 is a PCIMEM space that the CPU 102 can access via the ASIC 108. The engine PCI 602 is an engine PCI register mapped in the PCIMEM space that the CPU 102 can access via the ASIC 108.

The CONFIG register 223 also exists at the PCI 109 side of the ASIC 108 in order to be accessed from the engine section 110. Specifically, there are a base register to access the AGP space 504 of the NB 103, a base register to access the MEM-C 107 that is under the management of the ASIC 108, a base register to set an input address of a DMAC for image input from the video input section 218 of the ASIC 108, and a base register to set an output address of a DMAC for image output from the video output section 222 of the ASIC 108. These works are all carried out in the initialization process.

When the mapping ends, the memory map as shown in FIG. 5 is obtained. Therefore, the CPU 102 can access following this memory map. The engine section 110 can access the memory following the memory map as shown in FIG. 6. The engine section 110 carries out a self-diagnosis after the power source is turned on, and waits for a mapping by the CPU 102. After the initialization is over, the engine section 110 can also communicate with the CPU 102.

When the controller 101 completes the initialization of software, the controller 101 notifies the operating section 111 of a message that the printing is ready, and enters in a waiting state of waiting for a data reception from a host unit.

The ASIC 108 has an interface to make a connection with a host unit, such as a network, the IEEE1394, and the USB (Universal Serial Bus). When a data reception starts, the ASIC 108 sequentially interprets the transmission data, and starts drawing on the MEM-P 104. When the drawing is completed, the ASIC 108 transmits a command to the engine section 110, and instructs the engine section 110 to fetch the drawn picture.

The CPU 102 operates the internal register of the NB 103 to show the data of the MEM-P 104 in the space of the AGP 504, rewrites a table on the memory, and sets the table in the AGP space 514 so that the engine section 110 can look at the table. The engine section 110 receives a header address of the buffer in which the drawn picture exists, and starts the internal DMAC of the engine section 110 to read the picture of the MEM-P 505 through the AGP 514. The ASIC 108 carries out a target operation with respect to the PCI 109, and carries out a master operation with respect to the AGP 106. The engine section 110 reads the picture at an internally generated timing.

The engine section 110 shown in FIG. 1 is explained next. FIG. 7 shows an operation timing of the engine section 110 shown in FIG. 1. A paper size 701 shown in FIG. 7 is a size determined by a main scanning and a sub-scanning. An FGATE 702 is a signal indicating an effective range by the sub-scanning of the paper. An LGATE 703 is a signal indicating an effective range by the main scanning of the paper. An LSYNC 704 is a synchronization signal asserted at the header of the main scanning.

As explained above, the engine section 110 prepares the FGATE 702 of the effective range in the sub-scanning direction, the LGATE 703 of the effective range in the main scanning direction, and the LSYNC 704 indicating a start of each line at the header of each main scanning line, according to the paper size 701 of the output paper.

Upon receiving a printing instruction, the engine section 110 conveys paper, and prepares the FGATE 702 at the same time, and starts a data transfer of a picture to be read into the internal buffer before the FGATE 702 is asserted, by a few— LSYNC 704—time.

Figure 8:
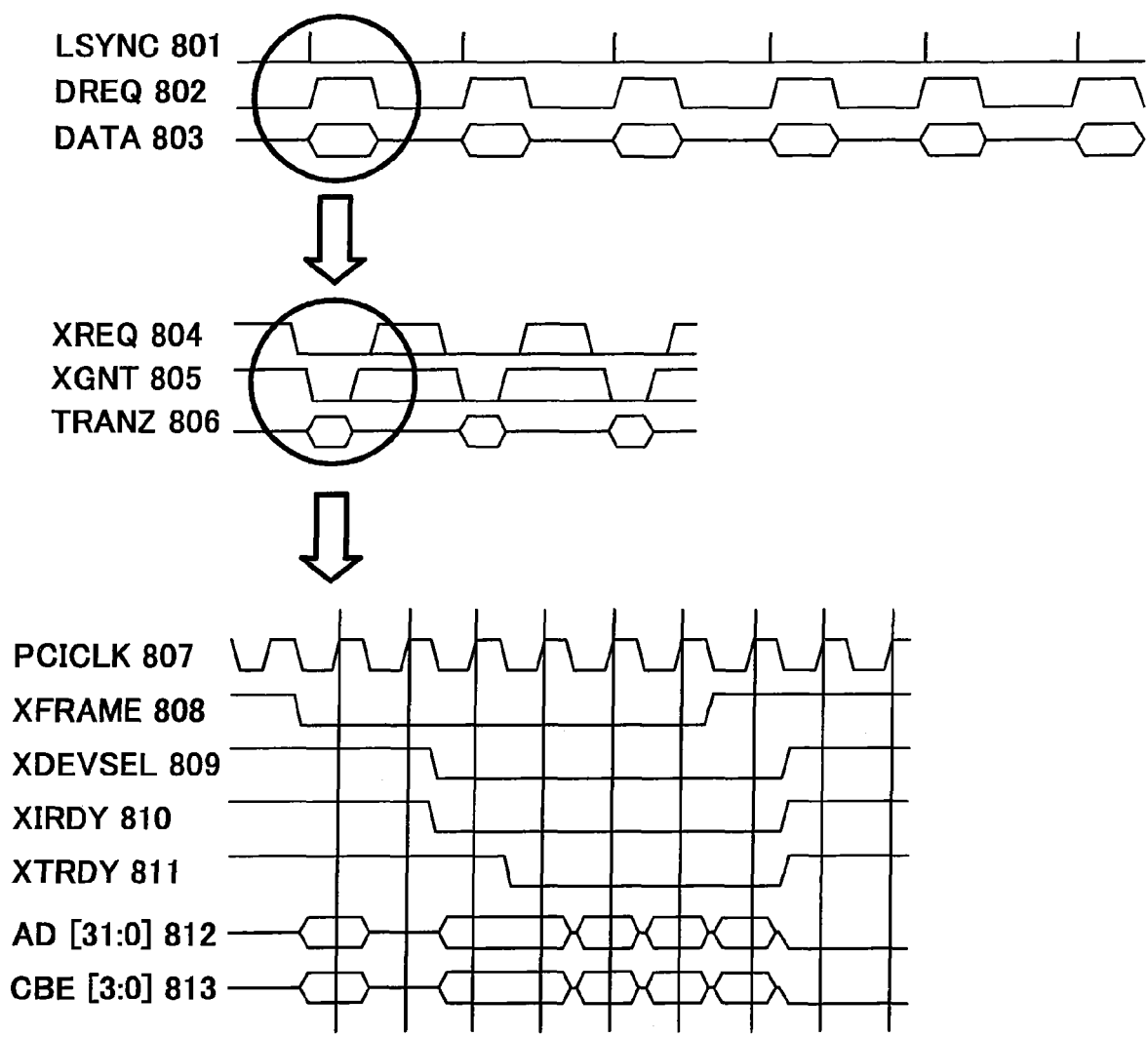
FIG. 8 shows basic timing signals of a PCI transfer.

FIG. 8 shows a basic timing signal of a PCI transfer. In FIG. 8, LSYNC 801 denotes a line synchronization. DREQ 802 denotes a data request. DATA 803 denotes a data transfer of one line. XREQ 804 denotes a bus request signal of the PCI bus. XGNT 805 denotes a bus grant signal of the PCI bus. TRANZ 806 denotes a bus transaction of the PCI bus.

PCICLK 807 denotes a basic clock of the PCI. XFRAME 808 denotes a FRAME signal of the PCI. XDEVSEL 809 denotes a DEVSEL signal of the PCI. XIRDY 810 denotes an IRDY signal of the PCI. XTRDY 811 denotes a TRDY signal of the PCI. AD [31:0] 812 denotes an address/data bus signal of the PCI. CBE [3:0] 813 denotes a command/byte enable signal of the PCI.

As shown in FIG. 8, the data transfer request DREQ 802 is asserted at a timing of the rising edge of the LSYNC 801, and a transfer of the DATA 803 of one line is completed. A data transfer of one line is carried out in synchronism with each LSYNC 801.

The XREQ 804 is asserted on the PCI 109. When the use of a bus is granted, the XGNT 805 is asserted, and one transaction 806 of the PCI is carried out. The data transfer of one line is completed after repeating the transaction 806 of the PCI. The transaction 806 of the PCI is a burst transfer.

The PCI signal is synchronous with the rising edge of the PCICLK 807. When the use of a bus is granted, the engine section 110 as a bus master asserts the XFRAME 808, and issues the address AD [31:0] 812 and the command CBE [3:0] 813 at the same time. The ASIC 108 asserts the XDEVSEL 809 when the address AD [31:0] 812 issued by the engine section 110 hits the base address register of the own CONFIG.

When the engine section 110 can receive data, the engine section 110 confirms the assert of the XDEVSEL 809, asserts the XIRDY 810, and informs the ASIC 108 as the target that it is possible to receive the data. When the data is ready for the command CBE [3:0] 813, the ASIC 108 asserts the XTRDY 811, and sets the data on the bus.

Thereafter, when there is data, one data per one clock is transferred continuously in synchronism with the PCICLK 807. At one clock before the last data, the engine section 110 as the bus master negates the XFRAME 808, and shows that the next data is the last data of the transaction. After the completion of the data transfer, the ASIC 108 negates the XDEVSEL 809 and the XIRDY 810. The engine section 110 negates the XTRDY 811, and completes the transaction.

Figure 9:
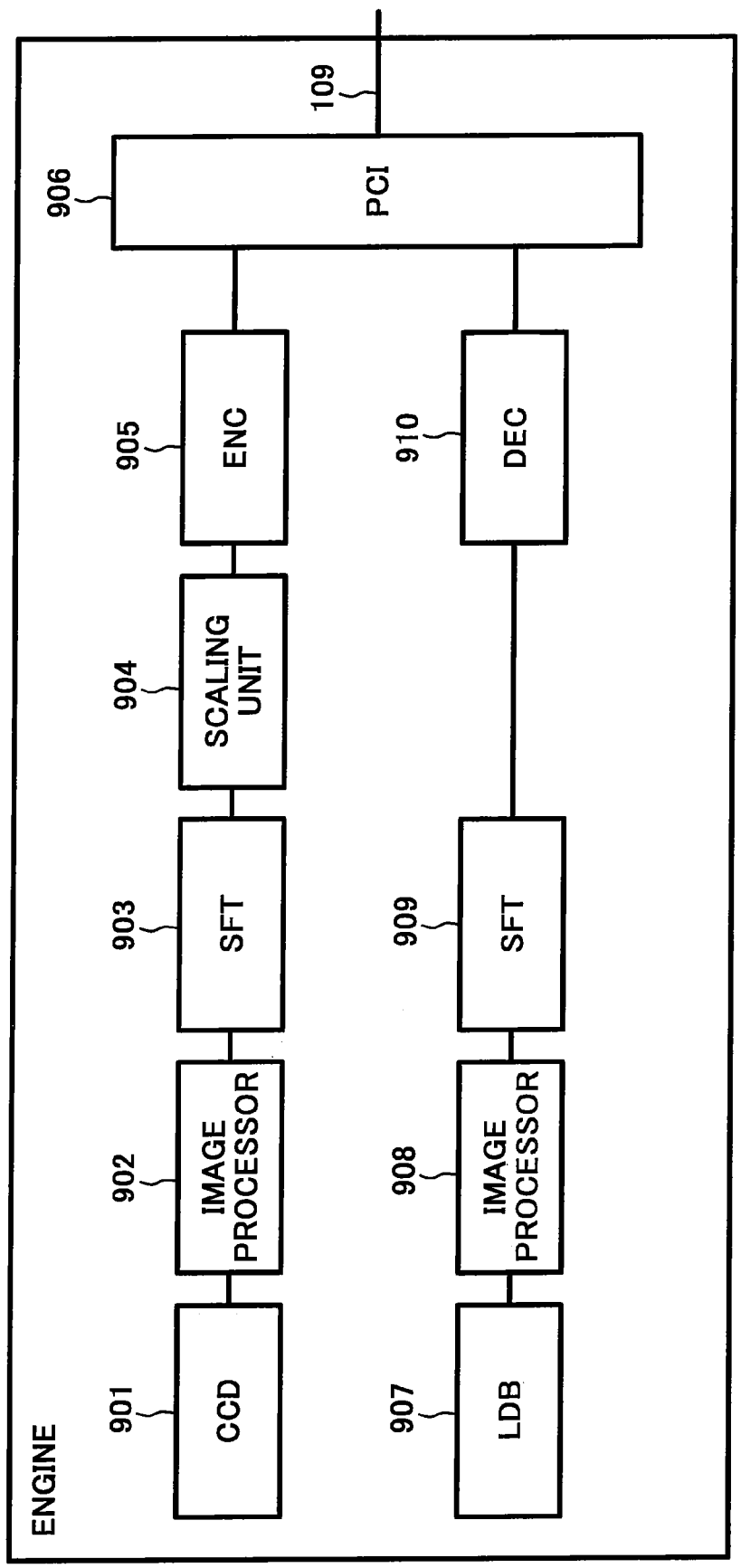
FIG. 9 is a block diagram of a scanner and a one-drum color plotter of the engine.

A detailed example of the engine section 110 shown in FIG. 1 is explained next. FIG. 9 is a block diagram of the scanner (the upper row in FIG. 9) and the one-drum color plotter (the lower row in FIG. 9) of the engine section 110 shown in FIG. 1.

In FIG. 9, a charge coupled device (CCD) 901 is an image reading element. An image processor 902 is an image processing unit that converts an analog signal read from the CCD 901 into a digital signal, and carries out shading correction, modulation transfer function (MTF) correction, and gamma correction.

An SFT 903 is an image shifting unit that shifts or extracts an image. A scaling unit 904 enlarges or reduces the image. An ENC 905 converts a multi-value image into a code.

A PCI unit 906 consists of a section that executes a bus protocol of a PCI, and a DMAC, and transfers an image to the controller. The PCI unit 906 also transfers a command received from the controller to the engine section.

A DEC 910 is a unit that decodes a code into an original image data. An SFT 909 is a unit that shifts or extracts an image at the output time. An image processor 908 is an image processing unit that carries out shading correction, MTF correction, and gamma correction of the image to be output. An LDB 907 is a unit that draws an image on a drum with a laser. The one-drum color plotter shown in FIG. 9 separates a full color image into colors of yellow, magenta, cyan, and black (Y, M, C, and K), and passes paper four times through the one-drum plotter, thereby to complete a full color output of one sheet of paper. Toners corresponding to colors are selected inside the engine section 110, and are transferred.

Figure 10:
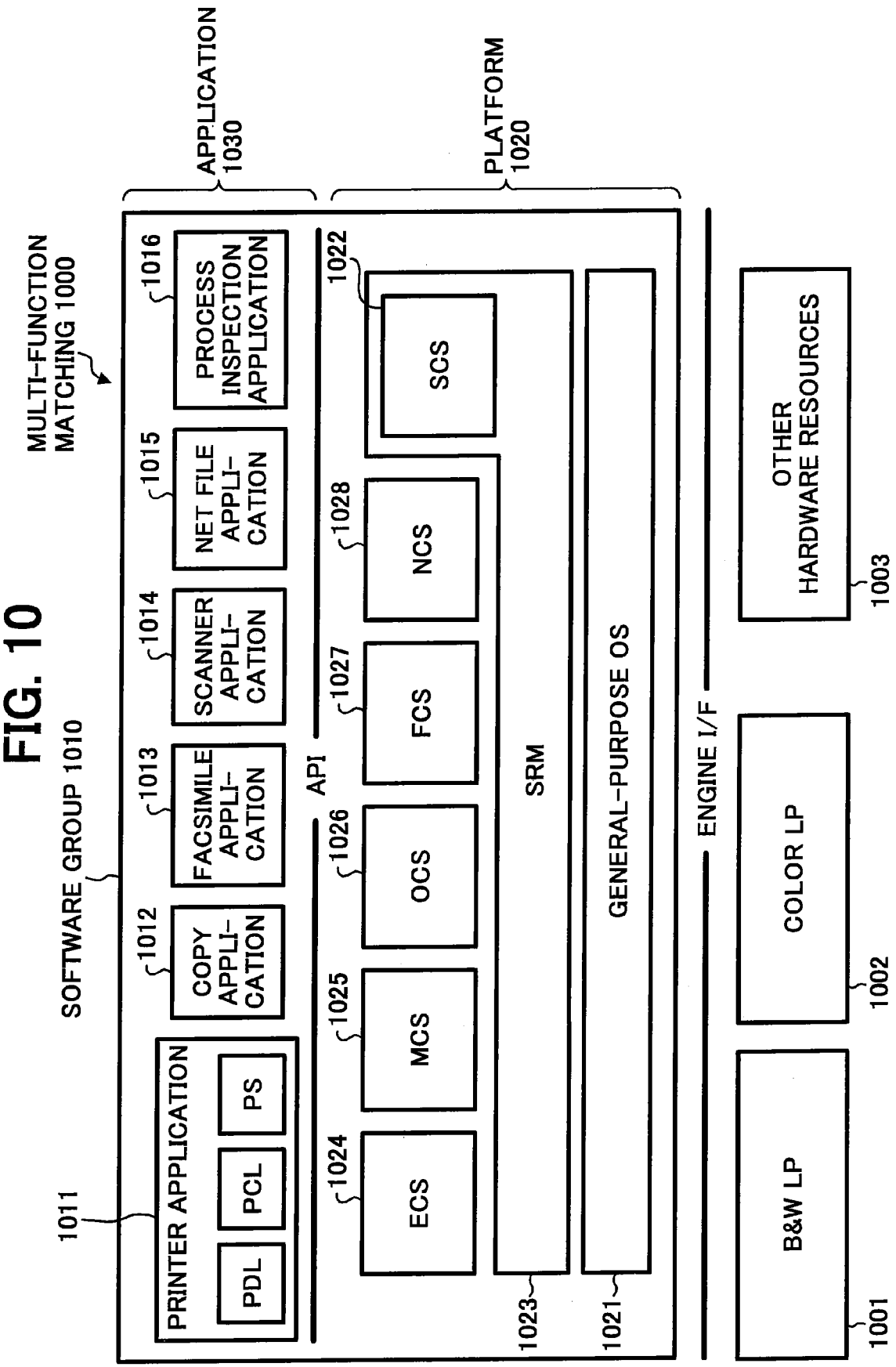
FIG. 10 is a block diagram of a functional structure of the multi-function machine according to the first embodiment.

The structure of software that operates on the multi-function machine 1000 having the above-described hardware configuration according to the present embodiment is explained next. FIG. 10 is a block diagram of a functional structure of the multi-function machine 1000 according to the first embodiment. As shown in FIG. 10, the multi-function machine 1000 includes a black and white line printer (B&W LP) 1001, a color line printer (Color LP) 1002, hardware resources 1003 including a scanner, a facsimile, a hard disk, a memory, and a network interface, and also includes a software group 1010 including a platform 1020 and an application 1030.

The platform 1020 has a control service that interprets a processing request from the application and generates a request for obtaining a hardware resource, an system resource manager (SRM) 1023 that manages one or more of hardware resources and arbitrates requests for obtaining hardware resources from the control service, and a general-purpose operating system (OS) 1021.

The control service is formed with a plurality of service modules including a system control service (SCS) 1022, an engine control service (ECS) 1024, a memory control service (MCS) 1025, an operation panel control service (OCS) 1026, a facsimile control service (FCS) 1027, and a network control service (NCS) 1028. The platform 1020 has an application program interface (API) that makes it possible to receive a processing request from the application 1030 based on a function defined in advance.

The general-purpose OS 1021 is a general-purpose operating system such as UNIX (a registered trademark). This general-purpose OS 1021 executes in parallel the software of the platform 1020 and the application 1030 as respective processes.

The SRM 1023 together with the SCS 1022 controls the system and manages the resources. The SRM 1023 arbitrates and controls the execution based on a request from a higher layer that utilizes the hardware resources of the engine for the scanner and the printer, the memory, the HDD file, and the host I/O (such as Centronics I/F, network I/F, IEEE 1394 I/F, and RS232C I/F).

Specifically, the SRM 1023 decides whether it is possible to utilize the requested hardware resource (i.e., whether the hardware resource is being utilized by other request). When it is decided that it is possible to utilize the requested hardware resource, the SRM 1023 informs the higher layer that it is possible to utilize the requested hardware resource. Further, the SRM 1023 schedules the utilization of the hardware resources based on requests from a higher layer, and directly executes the requested contents (for example, paper conveyance, imaging operation, ensuring of a memory, and generation of a file according to the printer engine).

The SCS 1022 carries out the management of the application, the control of the operating section, the display of the system screen, the light emitting diode (LED) display, the management of resources, and the control of an interruption application.

The ECS 1024 controls the engine of the black and white line printer (B&W LP) 1001, the color line printer (color LP) 1002, and the hardware resource 1003 including the scanner, the facsimile, and the like. The ECS 1024 reads and prints an image, notifies a status, and recovers the system from a paper jam.

Specifically, the ECS 1024 sequentially issues a print request to the SRM 1023 following the assignment of a job mode received from the application 1030, thereby to realize a series of operation of copying, scanning, and printing. It is assumed that a scanner is assigned to the image input device, and that a plotter is assigned to the image output device, for the job handled by the ECS 1024.

For example, "SCANNER→PLOTTER" is assigned when a copying operation is carried out, "SCANNER→MEMORY" is assigned when a file is stored, and "SCANNER→FAX_IN" is assigned when a facsimile transmission is carried out. "MEMORY→PLOTTER" is assigned when a printing of a stored file or a printing of data from the printer application 1011 is carried out. "FAX_OUT→PLOTTER" is assigned when a facsimile reception is carried out.

Although a definition of a job is different depending on the application, a processing operation of a set of image group that a user handles is defined as one job in the present embodiment. For example, in automatic document feeder (ADF) mode for copying, the operation of reading a set of documents placed on the document table is one job. In a pressure plate mode, the reading operation including an operation of determining a final document is one job. In a copying application 1012, the operation of copying a bundle of documents is one job. In a facsimile application 1013, the operation of transmitting one document or the operation of receiving one document is one job. In a printer application, the operation of printing one document is one job.

The MCS 1025 acquires and releases an image memory, utilizes a hard disk drive (HDD), and compresses and decompresses image data.

The FCS 1027 provides an API to carry out facsimile transmission and reception utilizing a PSTN/ISDN network from each application layer of the system controller, registration/citation of various facsimile data managed by a backup SRAM (BKM), facsimile reading, facsimile reception and printing, and fused transmission and reception.

The NCS 1028 provides services that can be commonly utilized by applications that require the network I/O. The NCS 1028 arbitrates the allocation of data received by each protocol from the network to each application, and the transmission of the data from the application to the network. Specifically, the NCS 1028 has a server daemon such as ftpd, httpd, lpd, snmpd, telnetd, and smtpd, and a client function of the same protocol.

The OCS 1026 controls the operation panel that serves as an information transmission unit between the operator (user) and the main body control. The OCS 1026 consists of an OCS processing section and an OCS library section. The OCS processing section obtains a key depression through the operation panel as a key event, and transmits a key event function corresponding to the obtained key to the SCS 1022. The OCS library section is registered in advance with a drawing function of outputting various kinds of drawing screens to the operation panel based on the request from the application 1030 or the control service, and a function of controlling other operation panel.

The application 1030 has the printer application 1011 as the application for the printer having a page description language (PDL), a printer control language (PCL) and a PostScript (PS). The application 1030 also has the copying application 1012 as the application for copying, the facsimile application 1013 as the application for a facsimile, a scanner application 1014 as the application for a scanner, a net file application 1015 as the application for a network file, and a process inspection application 1016 as the application for inspection of a process.

Figure 11:
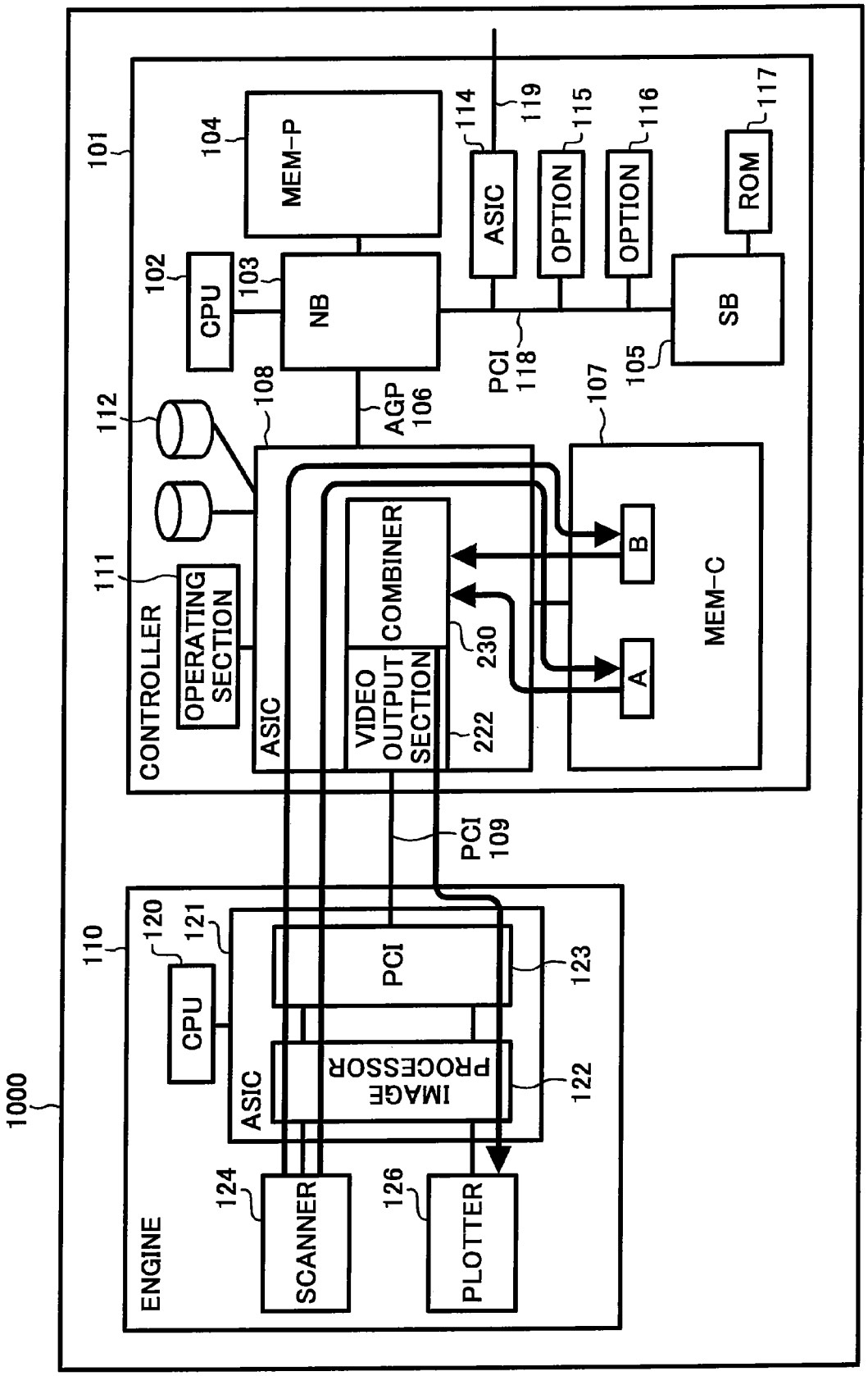
FIG. 11 shows a flow of image data within the controller when combined image data is not stored in an MEM-C during the copying operation.

The combining processing of image data during the copying operation in the ASIC 108 of the multi-function machine 1000 thus configured according to the first embodiment is explained next. FIG. 11 shows a flow of image data within the controller 101 when combined image data is not stored in the local memory MEM-C 107 during the copying operation.

First, the user sets a document to the scanner 124 of the engine section 110, and assigns the combining of two images through the operating section 111 as a copying condition, and depresses the start key.

The instruction made by the user through the key input is transmitted to the copying application 1012 that currently controls the screen via the OCS 1026. The copying application 1012 reads the request from the user, and issues a copy starting request to the ECS 1024. Upon receiving this copy starting request, the ECS 1024 controls the device driver of the general-purpose OS 1021, and requests the controller 101 to start copying. Upon receiving this copy starting request, the controller 101 instructs the engine section 110 to start scanning, via the PCI 109. Such a scanning operation is carried out to two sheets of document.

The scanner 124 reads the two scanner image data from the document. The image processor 122 A/D-converts the two scanned image data, and shifts the image data in a main scanning direction. When there is an assignment of scaling from the user, the image processor 122 performs scaling processing on the images based on an assigned magnification. The PCI 123 temporarily stores the image data in the local memory MEM-C 107 via the ASIC 108 of the controller 101.

Upon ending the reading of the image data into the local memory MEM-C 107, the controller 101 issues an instruction to the engine section 110 to output the image data. The engine section 110 follows the instruction, and the PCI 123 reads the image data from the controller 101 via the PCI 109. In other words, the engine section 110 generates read transaction of the PCI, and issues a reading request to the ASIC 108. The ASIC 108 reads the image data from the local memory MEM-C 107 according to this reading request, and starts passing the image data to the engine section 110.

As the image combining is assigned as the copying condition, the combiner 230 combines the two scanner image data stored in the local memory MEM-C 107 into one image data. The combined image data is passed from the video output section 222 to the engine section 110 via the PCI 109, without being stored in the local memory MEM-C 107 again. Therefore, it is not necessary to secure a work area for storing the combined image data in the local memory MEM-C 107. It is possible to output the image data at a high speed, by effectively utilizing the capacity of the MEM-C 107 and the bandwidth of the MEM-C 107. It is also possible to improve the performance of the multi-function machine 1000 with the black and white or color one-drum plotter.

When the PCI 123 of the engine section 110 receives the image data from the controller 101, the image processor 122 shifts the image data for outputting of the image, and outputs the image data to the plotter 126. Specifically, the image processor 122 passes the final image data to the laser driver board LDB 907 that draws the image onto a photoreceptor. The LDB 907 transfers the image, and develops and fixes the image. The image is printed on paper, and the paper is output to a discharge tray. The basic timing of scanning and plotting is as described above with reference to FIG. 7. The data transfer timing of the PCI 109 is as described above with reference to FIG. 8.

Figure 12:
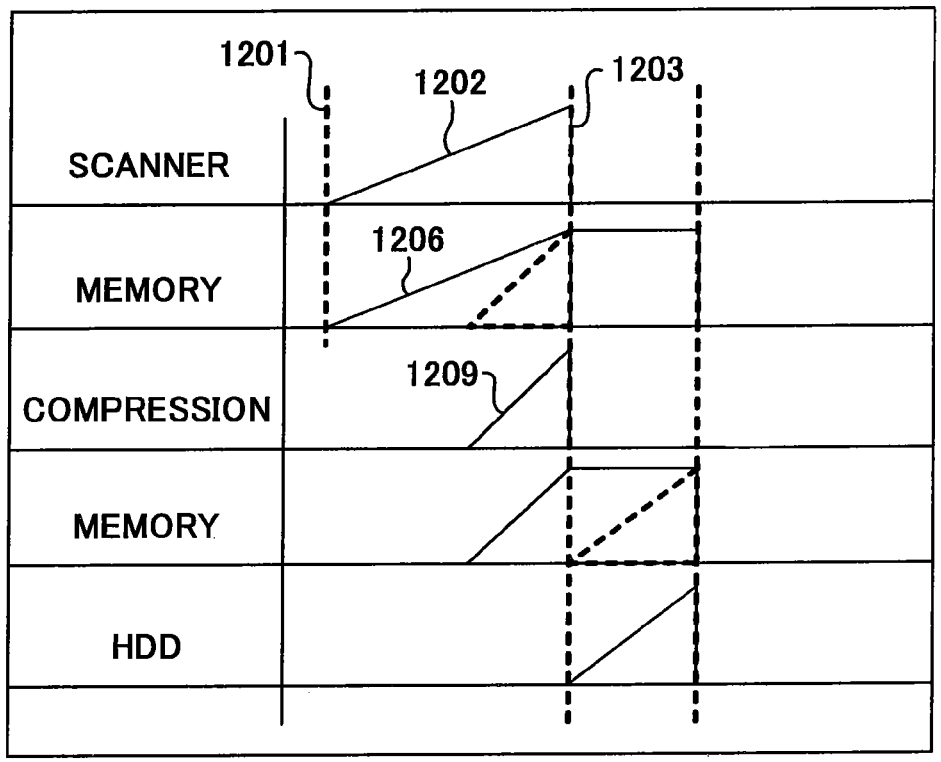
FIG. 12 shows a relationship between a scanner starting timing and a processing on a local memory MEM-C.

FIG. 12 shows a relationship between a starting timing of the scanner 124 and the processing on the local memory MEM-C 107. A scan starting timing 1201 is a timing at which the engine section 110 starts the processing after a command is issued to the engine section 110. At this timing, the image data is transferred to the local memory MEM-C 107. A triangular portion 1202 in FIG. 12 shows the transfer operation. The DMAC starts writing on the local memory MEM-C 107 at the same time when the scanning starts. A triangular portion 1206 shows a state of this operation. When the image is written on the local memory MEM-C 107, the compressor/decompressors 215 to 217 start compression. A compression starting timing is determined such that a compression completion time does not go ahead of an image reading completion time. In FIG. 12, a triangular portion 1209 shows the operation of the compressor/decompressors 215 to 217. The compression is completed at the same time as the completion of the reading by the scanner 124. Storing of the code data into the HDD 112 is started at a time 1203 when the compression is completed.

Figure 13:
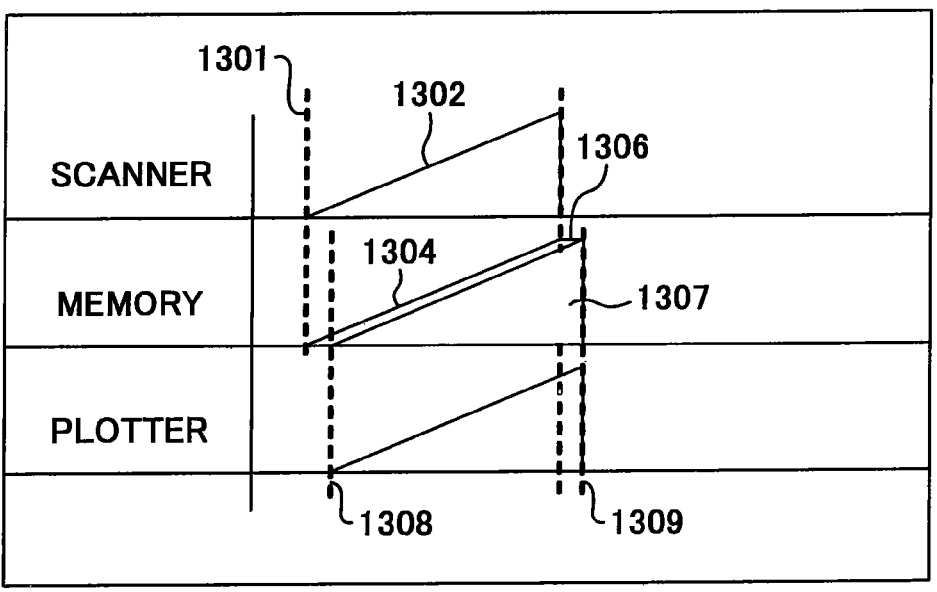
FIG. 13 shows a relationship between a plotter starting timing and a processing on the local memory MEM-C.

FIG. 13 shows a relationship between a starting timing of the plotter 126 and the processing on the local memory MEM-C 107. The scanner 124 starts an input 1302 at a timing 1301. At the same time, the image data is stored into the local memory MEM-C 107 as shown by 1304. The plotter 126 is started at a timing at which the image data is stored into the local memory MEM-C 107 to a certain extent and also at a timing 1308 when the plotting does not go ahead of the scanning. The plotting is completed after a time equivalent to a delay (1306) from the start of the scanning has passed (1309). It is necessary to keep the image on the local memory MEM-C 107 for this delay time (1307).

Figure 14:
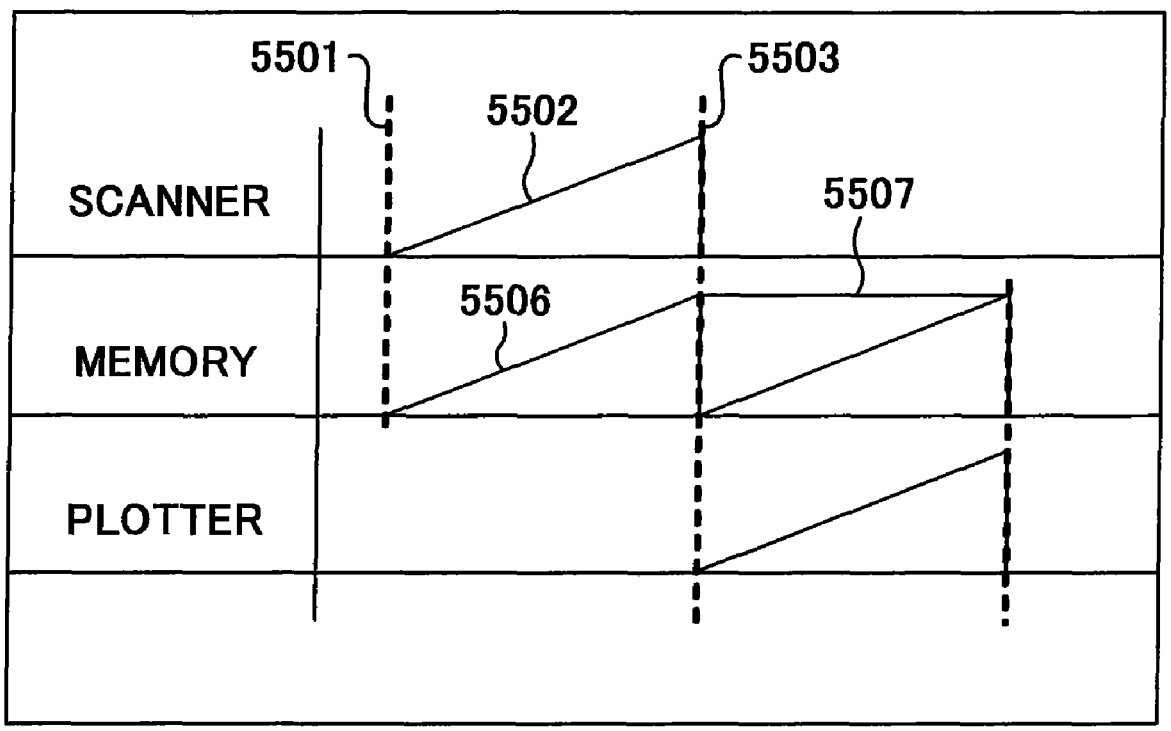
FIG. 14 shows another relationship between the plotter starting timing and the processing on the local memory MEM-C.

However, when a rotation processing is to be carried out after the operation of the image data is read (5502), it is not possible to start the rotation until all the data for the page is ready (5506) as shown in FIG. 14. Therefore, the time (5503) for starting the plotting is delayed. Consequently, the local memory MEM-C 107 holds the scanner image data for a longer time (5507) by this delay time.

Figure 15:
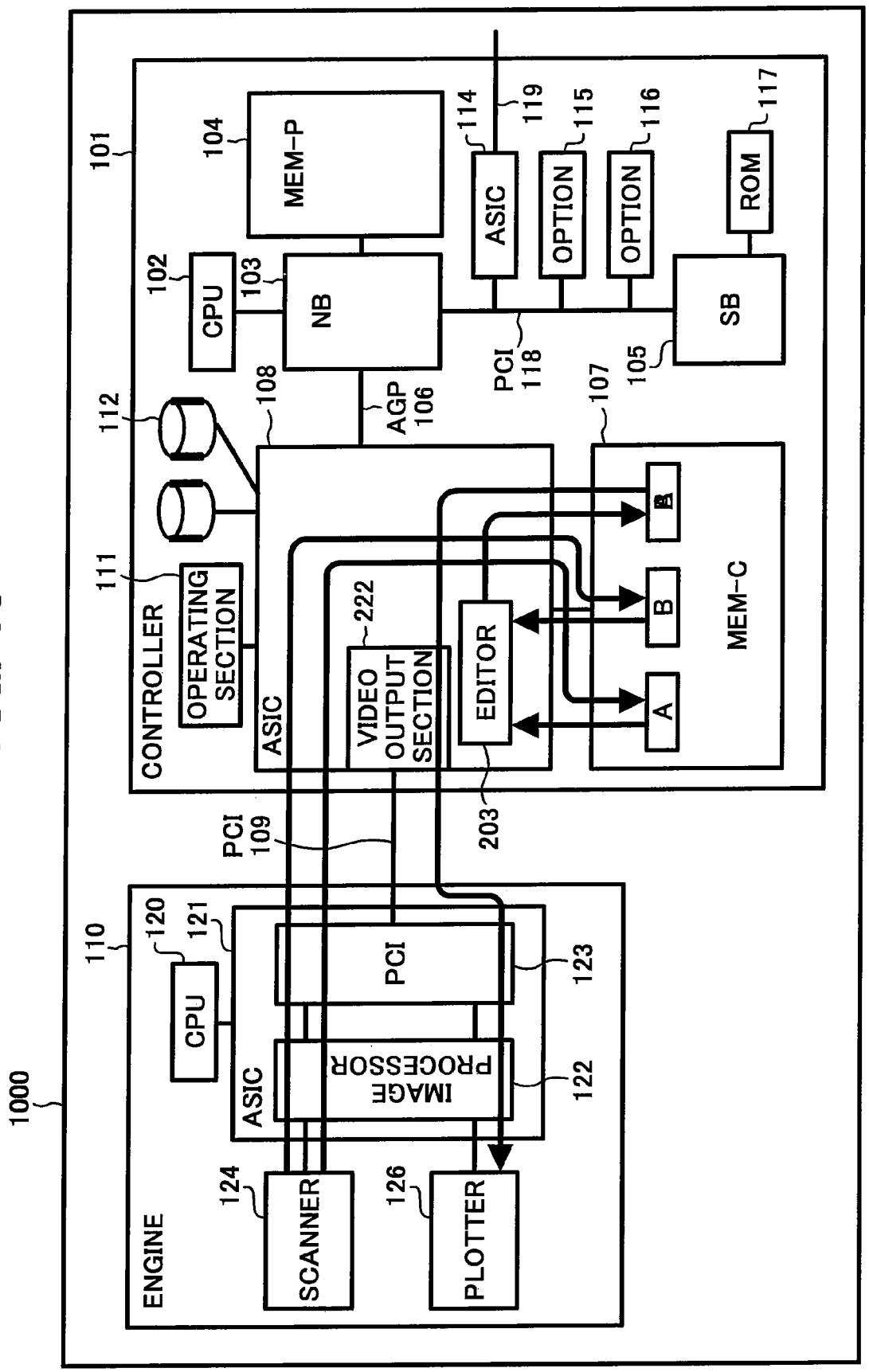
FIG. 15 shows a flow of image data within the controller when combined image data is stored in the MEM-C during the copying operation.

The combining processing when combined image data is stored in the memory during the copying operation is explained next. FIG. 15 shows a flow of image data within the controller 101 when combined image data is stored in the MEM-C 107 during the copying operation.

The processing since two document images are scanned until data for the two scanned images is stored into the MEM-C 107 is the same as the processing when the combined image data is not stored in the memory explained with reference to FIG. 11. When reading of the image data into the local memory MEM-C 107 is complete, the controller 101 issues an instruction to the engine section 110 to output the image data.

At this time, as the combining of the image data is assigned as the copying condition, the ASIC 108 combines the two scanner image data stored in the MEM-C 107 into one image data with the editor 203. The combined image data is stored into the MEM-C 107 again.

The engine section 110 follows the instruction from the controller 101, and the PCI 123 reads the image data from the controller 101 via the PCI 109. The ASIC 108 reads the combined image data from the local memory MEM-C 107 according to the reading request from the engine section 110. As a result, the combined image data stored in the MEM-C 107 is passed from the video output section 222 to the engine section 110 via the PCI 109. The subsequent processing of the engine section 110 is similar to the processing when the combined image data is not stored in the memory as explained with reference to FIG. 11.

Figure 16:
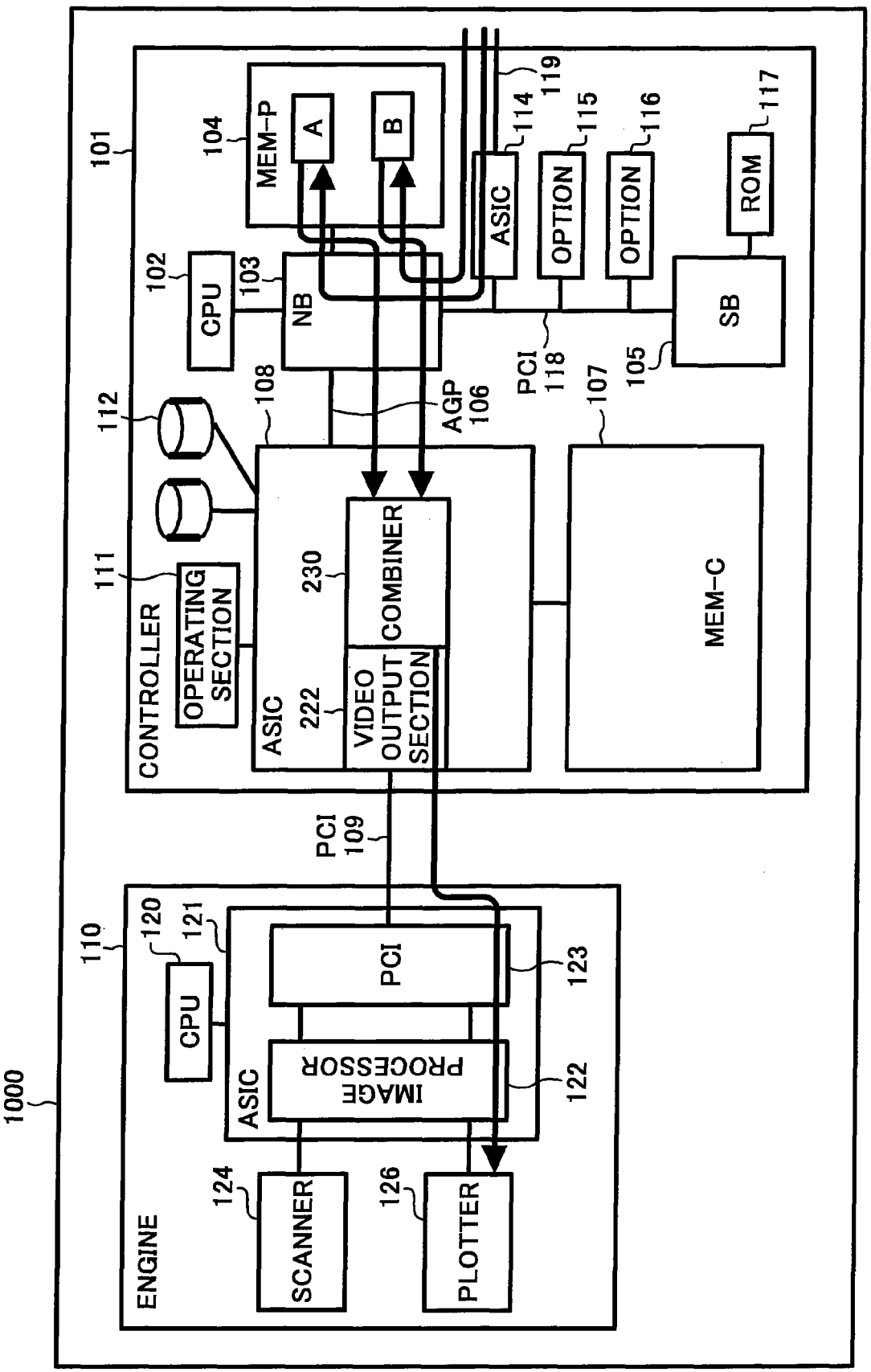
FIG. 16 shows a flow of image data within the controller when combined image data is not stored in the MEM-C during the printer operation.

The combining processing during the printing operation in the ASIC 108 of the multi-function machine 1000 according to the first embodiment is explained next. FIG. 16 shows a flow of image data within the controller 101 when combined image data is not stored in the local memory MEM-C 107 during the printer operation.

The multi-function machine 1000 according to the first embodiment is connected to a host personal computer (PC) (not shown) via a network interface terminal 119 of the ASIC 114. A case when this host PC assigns the combining of two document files and issues a printing request is considered. The printing request from the host PC is a printing instruction group described in a page description language (PDL).

The CPU 102 receives a network reception interruption from the ASIC 114, and receives printing data. The NCS 1028 processes this printing data. In other words, the NCS 1028 determines that the received data is the data to be printed by the printer, and passes this data to the printer application 1011. The printer application 1011 interprets the passed data, and passes the data to the PDL processor. The PDL processor sequentially processes the data, and draws a picture in the printer frame memory of the MEM-P 104. The drawing is carried out in a band unit cut in a rectangular shape, or a page unit, for example. The combiner 230 of the ASIC 108 combines two frames (image data) of the completed drawing into one image data, and stores the combined image data into the FIFO of the video output section 222, without storing the image data into the MEM-C 107. The CPU 102 waits until the engine section 110 reads the combined image data stored in the FIFO.

When the output of the image data is ready, the CPU 102 assigns the image data to be output, and issues a plot instruction to the engine section 110. In order to read the image data in the set mode, the engine section 110 accesses the FIFO address of the video output section 222 of the ASIC 108. Based on this, the plotter 126 outputs the printing data.

As explained above, the combined image data is output to the engine section 110, without being stored into the MEM-C 107. Therefore, it is not necessary to secure a work area for storing the combined image data in the local memory MEM-C 107. It is possible to output the data at a high speed by effectively utilizing the capacity of the MEM-C 107 and the bandwidth of the MEM-C 107. It is also possible to improve the performance of the multi-function machine 1000 with the black and white or color one-drum plotter.

Figure 17:
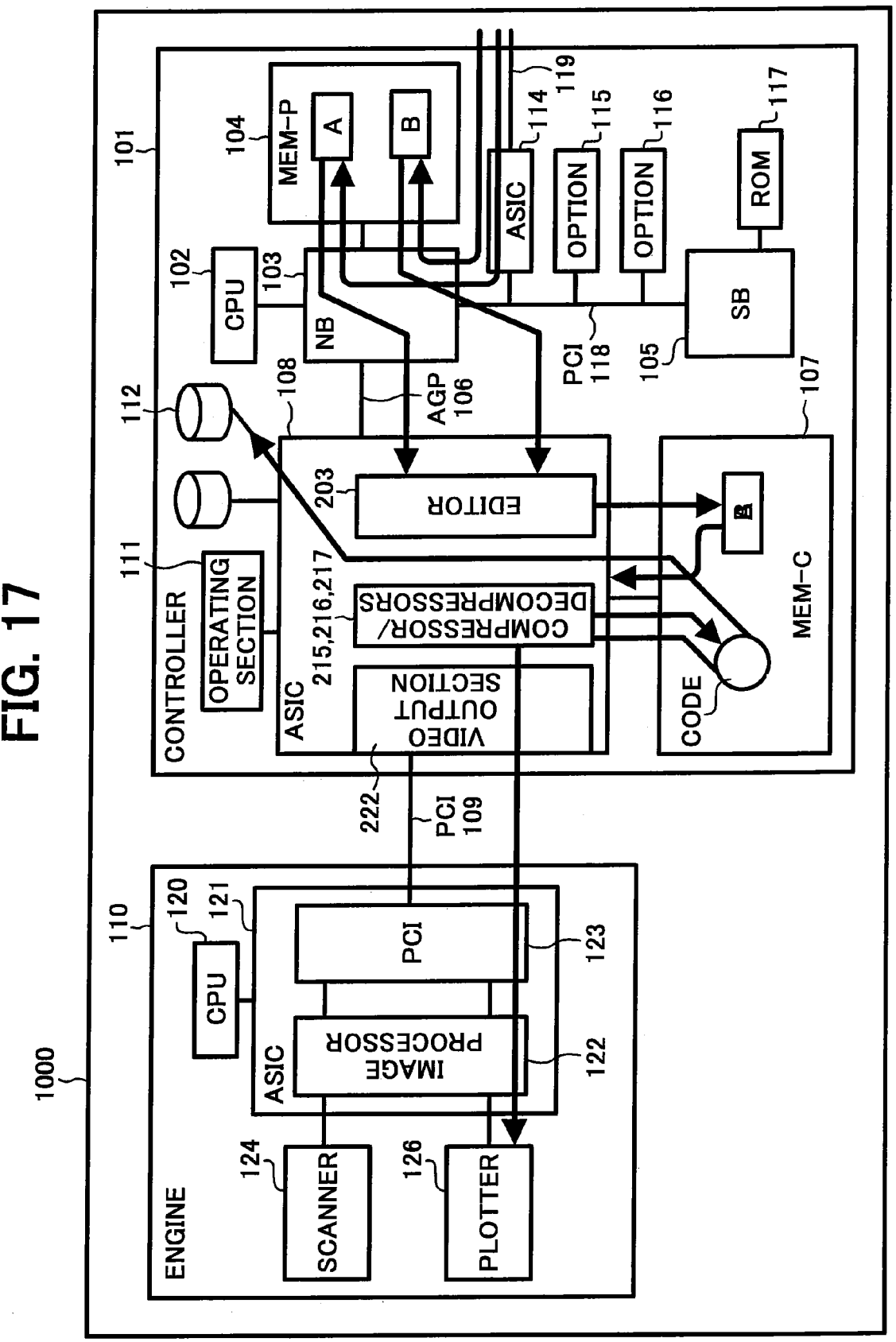
FIG. 17 shows a flow of image data within the controller when combined image data is stored in the local MEM-C during the printer operation.

The combining processing when combined image data is stored in the memory during the printer operation is explained next. FIG. 17 shows a flow of image data within the controller 101 when combined image data is stored in the local memory MEM-C 107 during the printer operation.

The processing from when the request for printing the assigned combined image data of two document files is received from the host PC on the network until when the two frames (image data) are generated in the MEM-P 104, is similar to the processing when the combined image data is not stored in the memory as explained with reference to FIG. 16. The editor 203 of the ASIC 108 combines the two frames of the completed drawing, and stores the image data as one image data into the local memory MEM-C 107.

Next, the compressor/decompressors 215 to 217 compress the combined image data, and transfer the compressed image data to the local memory MEM-C 107 as code data. The code data is stored in this format in the HDD 112 for a jam backup.

The compressor/decompressors 215 to 217 decompress the code data stored in the local memory MEM-C 107, and store the decompressed data into the FIFO of the video output section 222. The CPU 102 waits until the engine section 110 reads the image data stored in the FIFO. In other words, the image data decompressed by the compressor/decompressors 215 to 217 is output to the plotter 126 of the engine section 110, without being written back to the local memory MEM-C 107.

When the output of the image data is ready, the CPU 102 assigns the image data to be output, and issues a plot instruction to the engine section 110. In order to read the image data in the set mode, the engine section 110 accesses the FIFO address of the video output section 222 of the ASIC 108. Based on this, the plotter 126 outputs the printing data.

Figure 18:
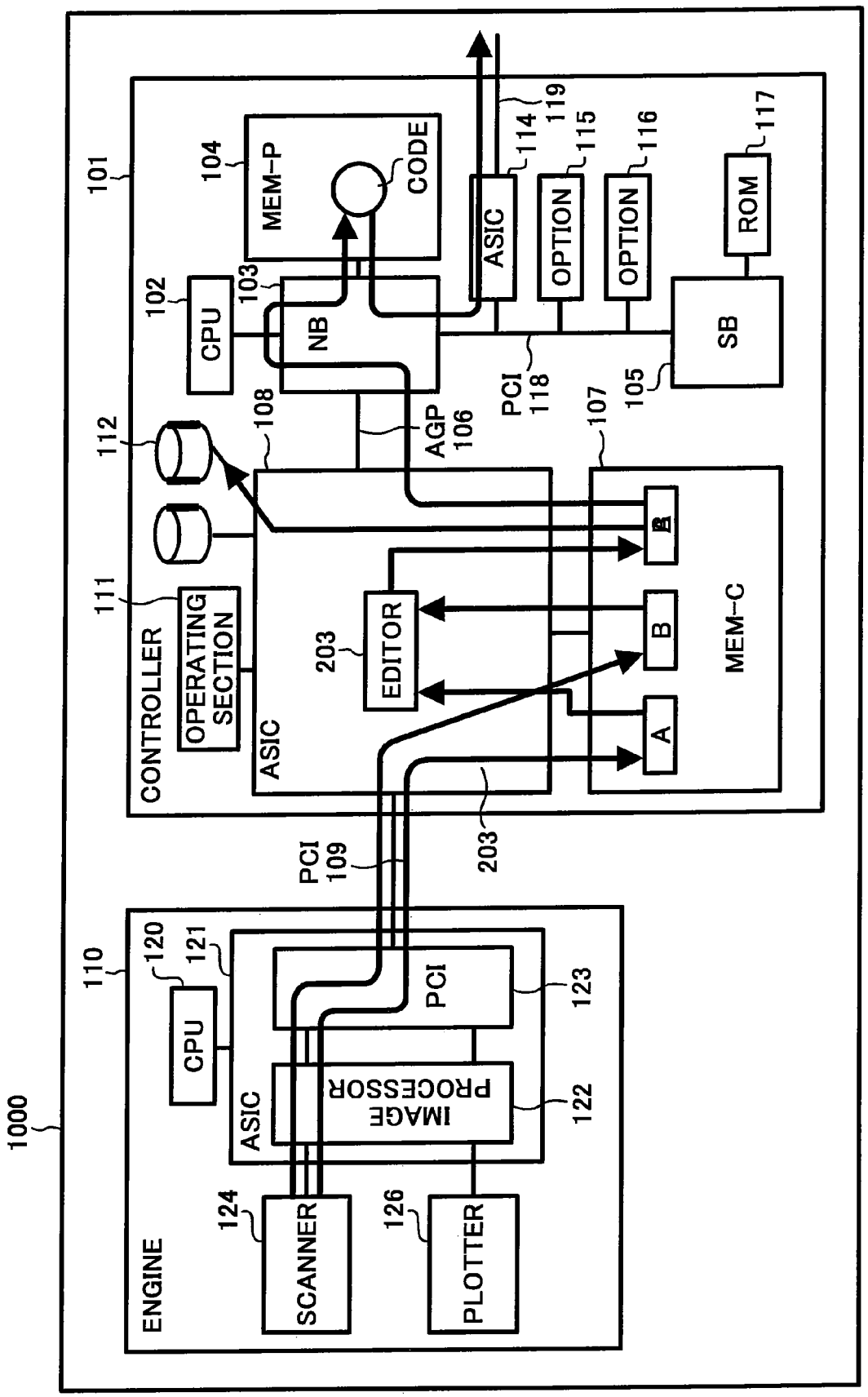
FIG. 18 shows a flow of image data within the controller during the scanning operation.

The combining processing carried out during the scanning operation in the ASIC 108 of the multi-function machine 1000 according to the first embodiment is explained next. FIG. 18 shows a flow of image data within the controller 101 during the scanning operation. The scanning operation does not require the plotter output. Therefore, the editor 203 carries out the combining processing, without using the combiner 230 directly coupled with the vide output section 222.

The scanner application 1014 provides scanner function such as the function of storing the scanned image into the HDD 112, and the function of transmitting the image to a host PC that has the image data receiving function at the same time as the storing of the image into the HDD 112.

In utilizing the scanner function, the user depresses the scanner key in the function switch key of the operating section 111. Based on this, the menu is switched, and the user can carry out settings of a reading condition and a transmission destination.

The case as follows is considered. That is, the case is such that the user sets the document to the automatic document feeder (ADF), selects both storing and transmission through the operating section 111, assigns the combining of scanned images of two pages, and depresses the starting key.

The input of the starting key is notified to the scanner application 1014 via the OCS 1026. The scanner application 1014 sets the video input section 218 of the ASIC 108 to the user's assigned mode, and starts the DMAC. The scanner application 1014 notifies the ECS 1024 of the scanning condition. The ECS 1024 receives the scanning condition, and sets the received scanning condition to the scanner 124 of the engine section 110 via the SCS 1022, the SRM 1023, and the general-purpose OS 1021, thereby to make the scanner 124 start the scanning operation.

The scanner 124 of the engine section 110 reads the image of the document while conveying the document. The read image data is stored into the FIFO of the video input section 218 of the ASIC 108 via the PCI 109. The video input section 218 of the ASIC 108 detects the input of the image data to the FIFO, reads the image data from the FIFO, and writes the image data to a specified address of the local memory MEM-C 107. The scanner 124 repeats this operation, and ends the processing of the images for the two pages. Then, the editor 203 combines the two image data stored in the MEM-C 107 into one image data, and stores the combined image data into the local memory MEM-C 107. The CPU 102 stores the combined image data stored in the local memory MEM-C 107 into the HDD 112.

The scanner 124 repeats the reading of the document and the storing of the image data into the local memory MEM-C 107 and the HDD 112 until no document is set on the ADF. When the reading of all the documents is completed and also the storing of the combined image data into the local memory MEM-C 107 and the HDD 112 is completed, the CPU 102 reads the data of the header page of the combined image data from the local memory MEM-C 107. The CPU 102 converts the read image data into image data (code data) of the TIF format, and writes this image data into the MEM-P 104. The NCS 1028 transmits the image data of the TIF format to the host PC (not shown) connected to the network, by utilizing the network I/F of the ASIC 114.

Figure 19:
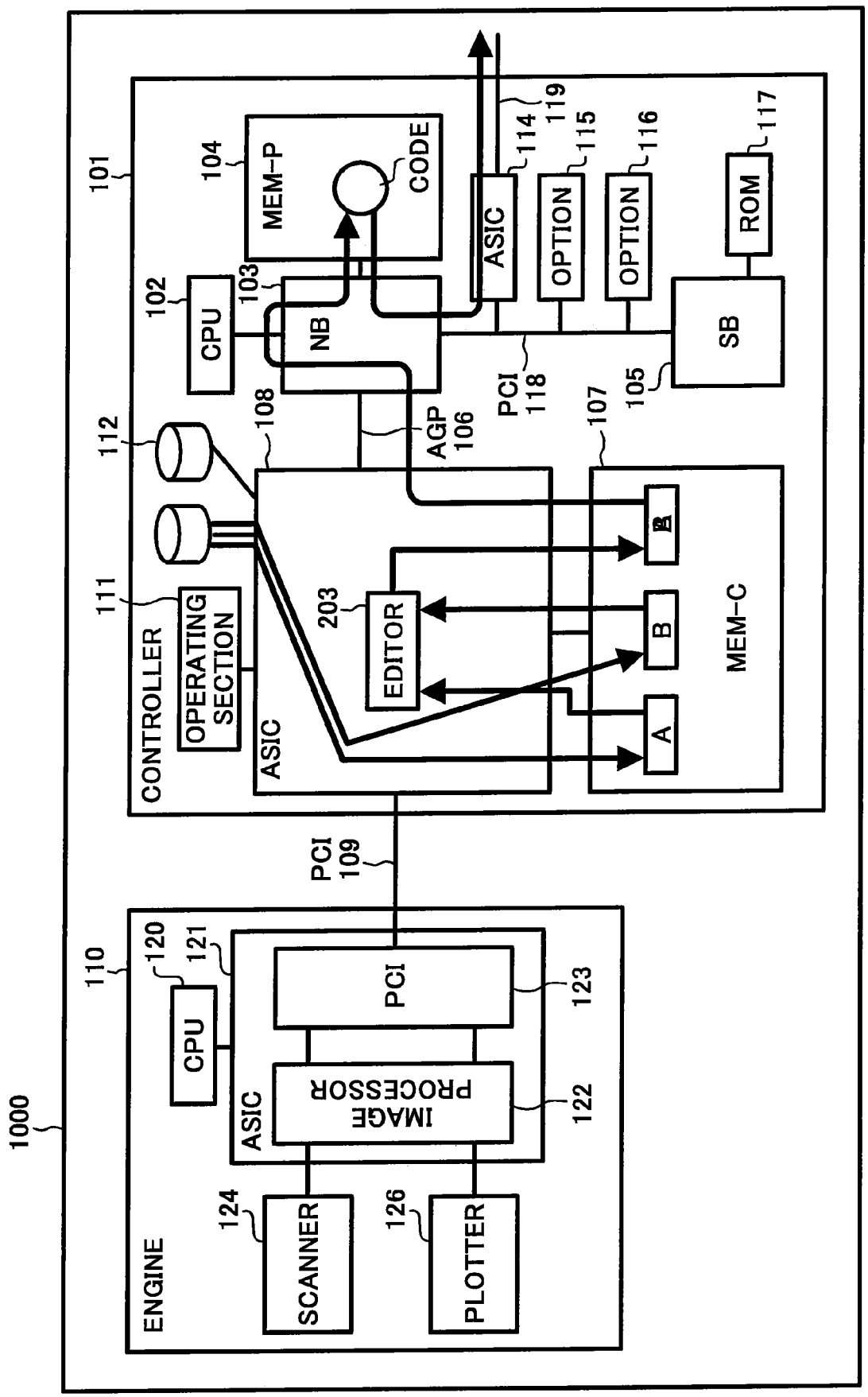
FIG. 19 shows a flow of image data within the controller when a net file application is utilized.

The combining processing when the net file application 1015 of the ASIC 108 in the multi-function machine 1000 according to the first embodiment is utilized is explained next. FIG. 19 shows a flow of image data within the controller 101 when the net file application 1015 is utilized.

The case as follows is considered. That is, the case is such that a host PC connected to the network obtains a combined image of two image data stored in the HDD 112. In this case, there is no plotter output, and therefore the editor 203 carries out the combining processing without using the combiner 230 directly coupled with the video output section 222.

When the host PC issues a request for obtaining two image data stored in the HDD 112, the NCS 1028 receives this obtaining request. The NCS 1028 notifies the net file application 1015 that there is the obtaining request. The net file application 1015 takes out the requested two image data from the HDD 112, and once stores the image data into the local memory MEM-C 107. The editor 203 combines the stored two image data into one image data, and stores the combined image data into the local memory MEM-C 107. The CPU 102 converts the combined image data stored in the local memory MEM-C 107, into the image data (code data) of the requested file format, and once stores the image data into the MEM-P 104. The converted image data is transmitted through the network I/F of the ASIC 114 to the host PC connected to the network.

As explained above, the multi-function machine 1000 according to the first embodiment has the combiner 230 and the editor 203 provided not within the engine section 110, but within the ASIC 108 connected to the NB 103 via the AGP bus 106. Therefore, it is possible to combine a plurality of image data at a high speed. As a result, it is possible to improve the performance of the image formation processing that includes the combining of a plurality of image data by the multi-function machine 1000 with the black and white or color one-drum plotter.

While the multi-function machine 1000 according to the first embodiment combines two image data in the above explanation, the multi-function machine can also combine a plurality of image data in the similar manner to the above-mentioned manner.

While the engine section 110 has the black and white or color one-drum plotter 126 in the multi-function machine 1000 according to the first embodiment, the multi-function machine according to a second embodiment utilizes a four-drum color plotter in the engine section 110.

Figure 20:
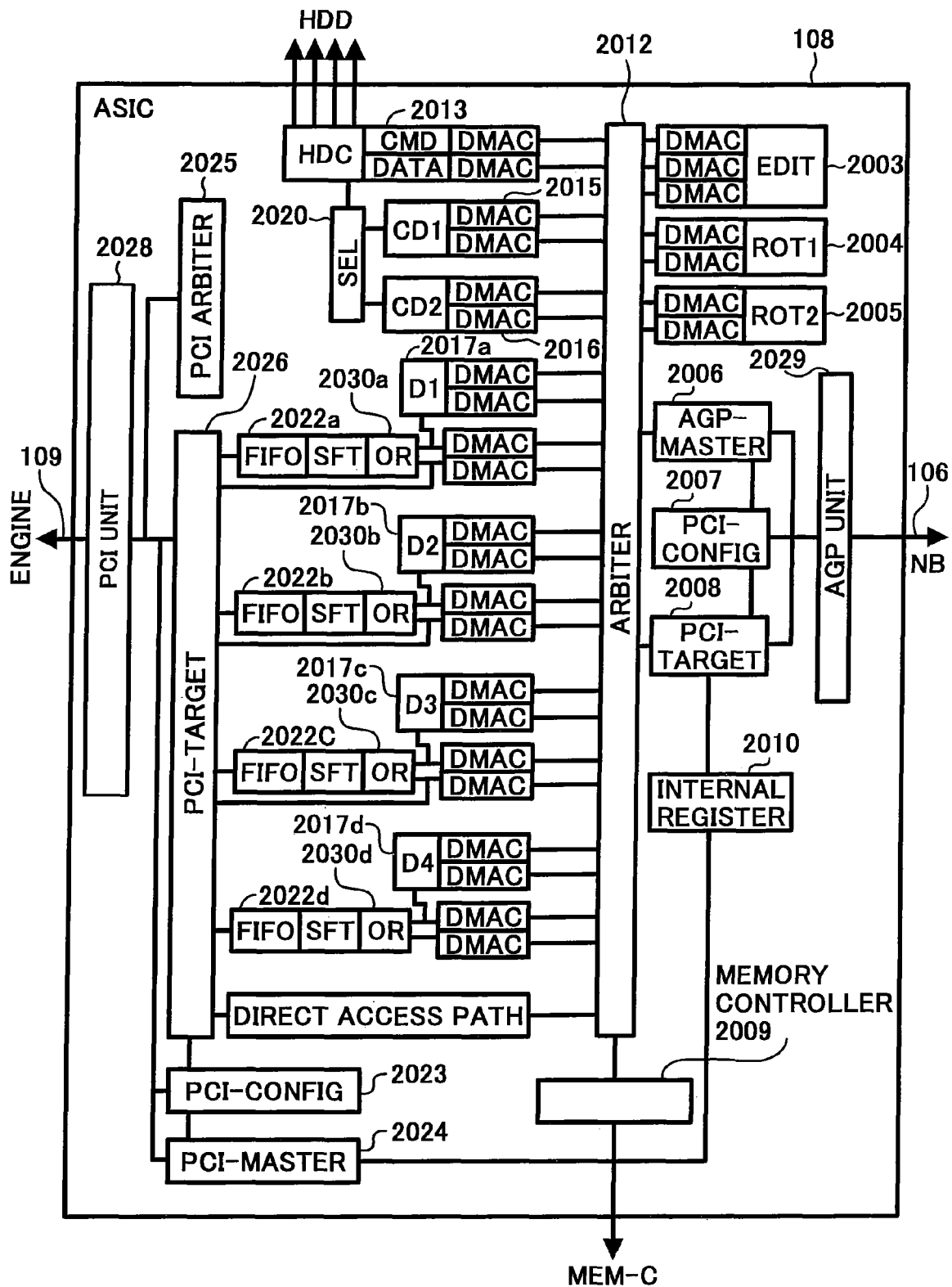
FIG. 20 is a block diagram of an ASIC of a multi-function machine according to a second embodiment of the present invention.

The total configuration of the multi-function machine according to the second embodiment is similar to that of the multi-function machine 1000 according to the first embodiment shown in FIG. 1. FIG. 20 is a block diagram of the ASIC 108. As shown in FIG. 20, this ASIC 108 has an AGP unit 2029, a configuration (PCI-CONFIG) register 2007, a master (AGP-MASTER) unit 2006, a target (PCI-TARGET) unit 2008, an internal register 2010, a memory controller 2009, a configuration (PCI-CONFIG) register 2023, a master (PCI-MASTER) unit 2024, a target (PCI-TARGET) unit 2026, a PCI unit 2028, an arbiter 2012, a PCI arbiter 2025, four combiners (OR) 2030*a* to 2030*d*, an editor (EDIT) 2003, two rotaters (ROT1 and ROT2) 2004 and 2005, an HDD controller 2013, two compressor/decompressors (CD1 and CD2) 2015 and 2016, four decompressors 2017*a* to 2017*d*, and four video output sections 2022*a* to 2022*d*.

In the second embodiment, the combiners (OR) 2030*a* to 2030*d*, and the editor (EDIT) 2003 are also provided in the ASIC 108. The configurations of these units are similar to those of the combiner 230 and the editor 203 according to the first embodiment respectively.

The four vide output sections 2022*a* to 2022*d* are provided corresponding to the four-drum color plotter. Each of the vide output sections 2022*a* to 2022*d* consists of video output DMACs, an SFT, and a FIFO that take the role of one plane, and can shift an image. The combiners (OR) 2030*a* to 2030*d* are coupled with the video output sections 2022*a* to 2022*d* respectively.

The decompressors (D1 to D4) 2017*a* to 2017*d* decompress compressed image data. The decompressors (D1 to D4) 2017*a* to 2017*d* are connected to the video output sections 2022*a* to 2022*d* respectively. Therefore, these decompressors can output decompressed image data to the engine section 110 while decompressing the compressed image data. The rest of the configuration is similar to that of the ASIC 108 according to the first embodiment, and therefore, explanation thereof is omitted.

Figure 21:
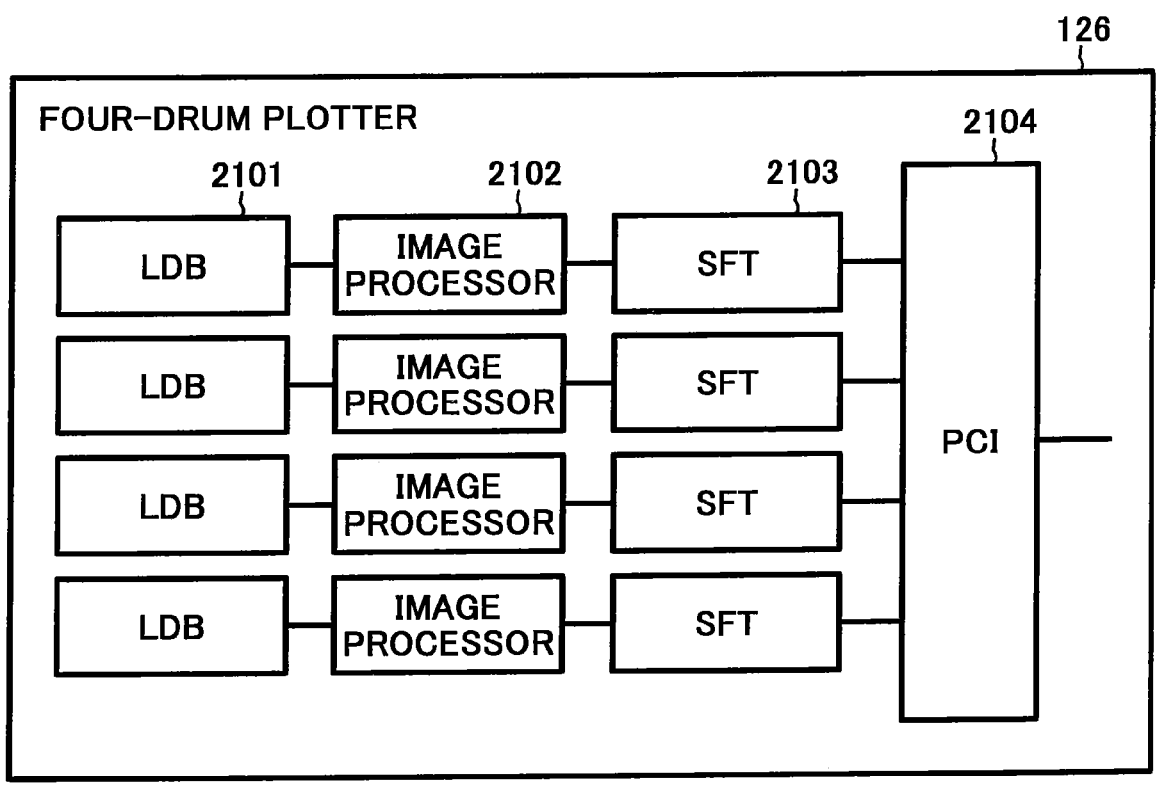
FIG. 21 is a block diagram of a four-drum color plotter used for the engine of the multi-function machine according to the second embodiment.

The four-drum color plotter used as the engine section 110 is explained below. FIG. 21 is a block diagram of the four-drum color plotter used as the engine section 110. Each drum unit has a toner corresponding to each color. Each drum unit reads necessary image data at an address assigned by a command of a memory space of the ASIC 108 as a target, a few line period before each drum unit outputs a picture corresponding to a physical position. A laser driving section LDB 2101, an image processor 2102, an image shift processor (SFT) 2103, a drum related section, and a DMAC are collectively called the drum unit.

The image processor 2102 is an image processing unit that converts an obtained analog signal into a digital signal, and carries out shading correction, MTF correction, and gamma correction. The SFT 2103 is an image shifting unit that shifts or extracts an image.

Each drum unit is allocated to each color, and outputs an image plane of Y, M, C, and K. When an image is to be transferred in the order of Y, M, C, and K starting from a drum nearest to a paper conveying tray, the DMAC of the color Y reads the data for one main scanning line component at the assigned address of the ASIC 108.

The DMACs for colors exist in a PCI block 2104 shown in FIG. 21. The DMACs are arbitrated when necessary, and image data of each color is sequentially transferred. Each color is transferred in a burst unit at the timing shown in FIG. 8. Y, M, C, and K are not synchronized with each other. A request for transferring each color is generated at a necessary timing. FIG. 8 shows a transfer timing of a single color. When the transfer timings are congested most on the PCI bus, the burst transfer of Y, M, C, and K is actually carried out alternately.

Figure 22:
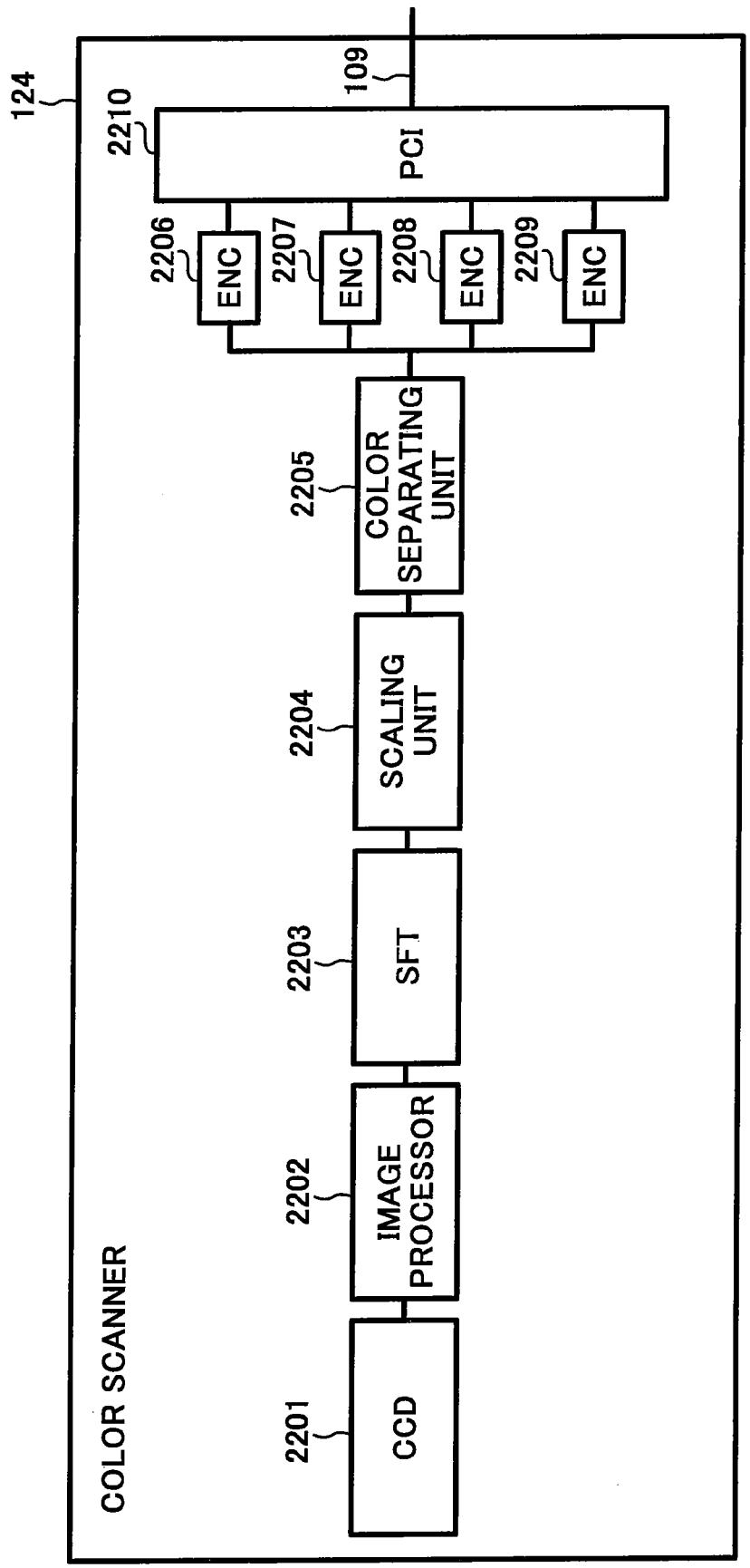
FIG. 22 is a block diagram of a color scanner used as the engine of the multi-function machine according to the second embodiment.

The color scanner used as the engine section 110 is explained next. FIG. 22 is a block diagram of the color scanner used as the engine section 110 shown in FIG. 1. In FIG. 22, a CCD 2201 is a color reading element that can read three colors at the same time. An image processor 2202 is an image processing unit that converts an analog signal read from the CCD 2201 into a digital signal, and carries out shading correction, MTF correction, and gamma correction.

An SFT 2203 is an image shifting unit that shifts or extracts an image. A scaling unit 2204 is a unit that enlarges and reduces the image. A color separating unit 2205 separates three colors of R, G, and B (Red, Green, and Blue) into four colors of YMCK. ENCs 2206 to 2209 convert a multi-value image into a code.

A PCI unit 2210 consists of a section that executes a bus protocol of a PCI, and a DMAC, and transfers an image to the controller. The PCI 2210 also transfers a command from the controller to the engine section 110.

Upon receiving an instruction from a host unit or from a user through the operating section 111, the scanner 124 reads the image, and transfers the read image to the memory of the controller 101. It is possible to select the MEM-C 107 or the MEM-P 104 for the memory. The controller 101 passes the image read through the network I/F or the like to the user.

The flow of the image is explained next. The image processor 2202 converts data for images of R, G, and B read by the CCD 2201 from an analog signal into a digital signal, and carries out MTF correction, shading correction, and gamma correction of the signal. The image shifting unit 2203 shifts and extracts the image corresponding to the assigned area of the reading area and thereafter, the scaling unit 2204 converts the image according to the specified magnification or resolution.

The color separating unit 2205 keeps the R, G, and B as they are when the reading request is R, G, and B, and separates the colors into Y, M, C, and K when the reading request is Y, M, C, and K. When a code is requested by the command, an encoder converts the signal into a code. The color separating unit 2205 passes the converted signal to the PCI unit 2210. The DMACs exist corresponding to respective colors within the PCI unit 2210. By matching the reading timing, the PCI unit 2210 transfers the image data to the controller 101 via the PCI bus 109. The controller 101 can receive data for each color.

The multi-function machine according to the second embodiment is mounted with the controller 101 having the ASIC 108 configured as described above. The operations of the copying, printing, and scanning, the operation utilizing the net file application 1015, and the flow of image data including the combining of a plurality of image data are similar to the processing and the image data flow according to the first embodiment explained with reference to FIG. 11 to FIG. 19.

As explained above, the multi-function machine according to the second embodiment has the combiners 2030a to 2030d and the editor 2003 provided not within the engine section 110, but within the ASIC 108 connected to the NB 103 via the AGP bus 106. Therefore, it is possible to combine a plurality of image data at a high speed. As a result, it is possible to improve the performance of the image formation processing that includes the combining of a plurality of image data by the multi-function machine 1000 with the four-drum color plotter.

In the first and second embodiments, the controller according to the present invention is mounted on the multi-function machine but the application is not limited to this. It is also possible to apply the invention to other image forming apparatuses that carry out an image formation processing, such as a printer and a copying machine.

As explained above, according to one aspect of the present invention, when a CPU whose interface is not made open is utilized for the controller of an image forming apparatus, it is possible to carry out a proper data transfer between the CPU and the engine section based on smooth switching control. It is possible to combine a plurality of scanner image data at a high speed, as compared with the combining of image data in the engine section. Therefore, it is advantageously possible to improve the performance of the image formation processing that includes the combining of a plurality of image data by the image forming apparatus with the black and white or color one-drum plotter.

Moreover, at the time of the switching control, it is possible to carry out the combining of scanner image data within the same switching controller. Therefore, it is advantageously possible to combine a plurality of scanner image data at a high speed.

Furthermore, it is possible to output combined scanner image data at a high speed by effectively utilizing the memory capacity and the bandwidth of the memory. Therefore, it is advantageously possible to improve the performance of the image forming apparatus with the black and white or color one-drum plotter.

Moreover, in the processing of not outputting image data to the engine interface, a plurality of scanner image data are combined within the switching controller, and the combined image data is stored in the memory. Therefore, it is possible to output the combined scanner image data at a high speed by effectively utilizing the memory capacity and the bandwidth of the memory. As a result, it is advantageously possible to improve the performance of the image forming apparatus with the black and white or color one-drum plotter.

Furthermore, it is advantageously possible to transfer data at a high speed via the AGP.

Moreover, it is advantageously possible to eliminate the need for changing the connection format of the engine section.

Furthermore, it is possible to increase the number of hard disks according to the needs without a constraint of the performance of a single hard disk drive. Therefore, it is advantageously possible to obtain a transfer speed of a hard disk drive necessary for the high-speed image forming apparatus with the black and white or color one-drum plotter.

According to another aspect of the present invention, when a CPU whose interface is not made open is utilized for the controller of an image forming apparatus, it is possible to carry out a proper data transfer between the CPU and the engine section based on smooth switching control. It is possible to combine a plurality of scanner image data at a high speed, as compared with the combining of image data in the engine section. Therefore, it is advantageously possible to improve the performance of the image formation processing that includes the combining of a plurality of image data by the image forming apparatus with the four-drum color plotter.

Moreover, at the time of the switching control, it is possible to carry out the combining of scanner image data within the same switching controller. Therefore, it is advantageously possible to combine a plurality of scanner image data at a higher speed.

Furthermore, it is possible to output combined scanner image data by effectively utilizing the memory capacity and the bandwidth of the memory. Therefore, it is advantageously possible to improve the performance of the image forming apparatus with the four-drum color plotter.

Moreover, in the processing of not outputting to the engine interface, a plurality of scanner image data are combined within the switching controller, and the combined image data is stored in the memory. Therefore, it is possible to output the combined scanner image data by effectively utilizing the memory capacity and the bandwidth of the memory. As a result, it is advantageously possible to improve the performance of the image forming apparatus with the four-drum color plotter.

Furthermore, it is advantageously possible to transfer data at a high speed via the AGP.

Moreover, it is advantageously possible to avoid the need for changing the connection format of the engine section.

Furthermore, it is possible to increase the number of hard disks according to the needs without a constraint of the performance of a single hard disk drive. Therefore, it is advantageously possible to obtain a transfer speed of a hard disk drive necessary for the image forming apparatus with the four-drum color plotter.

The present document incorporates by reference the entire contents of Japanese priority document, 2002-136032 filed in Japan on May 10, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image forming apparatus, comprising:
   a controller that includes an integrated circuit for image processing; and
   an engine unit that is connected to the controller and includes
      a scanner that scans a medium and obtains scanner image data;
      a plotter that plots an image based on input plotter data, wherein the plotter is as either one of a black and white plotter and a one-drum color plotter; and
      a first central processing unit that controls image formation,
   wherein the controller includes an engine interface to connect to the engine unit;
a second central processing unit with a chip-set;
a chip-set interface to connect the chip-set of the second central processing unit; and
a switching controller that controls whether
   to output the scanner image data, which is input through the engine interface, to the engine interface as the plotter data for the plotter, or
   to output the scanner image data to the chip-set interface, or
   to output image data input through the chip-set interface to the engine interface as the plotter data for the plotter.

2. The image forming apparatus according to claim 1, further comprising:
a combining controller that combines a plurality of the scanner image data to generate one scanner image data,
wherein the switching controller further includes a hard disk controller that can increase a number of hard disk drives to be connected according to input and output processing capacity of image data.

3. The image forming apparatus according to claim 2, wherein the combining controller is provided inside the switching controller.

4. The image forming apparatus according to claim 2, wherein
the combining controller includes a first combining unit that combines the plurality of scanner image data when outputting the scanner image data to the engine interface, and
when outputting the scanner image data combined by the first combining unit to the engine interface, the switching controller directly outputs the combined scanner image data to the engine interface without outputting to the memory.

5. The image forming apparatus according to claim 2, wherein
the combining controller includes a second combining unit that combines the plurality of scanner image data, and
the switching controller outputs the scanner image data combined by the second combining section to the memory.

6. The image forming apparatus according to claim 1, wherein
the chip-set interface is an accelerated graphic port, and connects a north bridge that forms a part of the chip-set of the second central processing unit to the accelerated graphic port.

7. The image forming apparatus according to claim 1, wherein
the engine interface is a peripheral component interconnect interface that accommodates a peripheral component interconnect bus, and connects the engine unit to the peripheral component interconnect interface.

8. An image forming apparatus comprising:
a controller that includes an integrated circuit for image processing; and
an engine unit that is connected to the controller and includes
a scanner that scans a medium and obtains scanner image data;
a four-drum color plotter that plots an image based on input plotter data; and
a first central processing unit that controls image formation,
wherein the controller includes
an engine interface to connect to the engine unit;
a second central processing unit with a chip-set;
a chip-set interface to connect the chip-set of the second central processing unit; and
a switching controller that controls whether
   to output the scanner image data, which is input through the engine interface, to the engine interface as the plotter data for the plotter, or
   to output the scanner image data to the chip-set interface, or
   to output image data input through the chip-set interface to the engine interface as the plotter data for the plotter.

9. The image forming apparatus according to claim 8, further comprising:
a combining controller that combines a plurality of scanner image data to generate one scanner image data,
wherein the switching controller further includes a hard disk controller that can increase the number of hard disk drives to be connected according to input and output processing capacity of image data.

10. The image forming apparatus according to claim 9, wherein the combining controller is provided inside the switching controller.

11. The image forming apparatus according to claim 9, wherein
the combining controller includes a first combining unit that combines the plurality of scanner image data when outputting the scanner image data to the engine interface, and
when outputting the scanner image data combined by the first combining unit to the engine interface, the switching controller directly outputs the combined scanner image data to the engine interface without outputting to the memory.

12. The image forming apparatus according to claim 9, wherein
the combining controller includes a second combining unit that combines the plurality of scanner image data, and
the switching controller outputs the scanner image data combined by the second combining section to the memory.

13. The image forming apparatus according to claim 8, wherein
the chip-set interface is an accelerated graphic port, and connects a north bridge that forms a part of the chip-set of the central processing unit to the accelerated graphic port.

14. The image forming apparatus according to claim 8, wherein
the engine interface is a peripheral component interconnect interface that accommodates a peripheral component interconnect bus and connects the engine unit to the peripheral component interconnect interface.

* * * * *